United States Patent [19]
Iwasaki et al.

[11] Patent Number: 5,790,903
[45] Date of Patent: Aug. 4, 1998

[54] ZOOM LENS DEVICE

[75] Inventors: Hiroyuki Iwasaki; Hiroshi Tsuchitani, both of Saitama, Japan

[73] Assignee: Fuji Photo Film Co., Ltd., Kanagawa, Japan

[21] Appl. No.: 912,399

[22] Filed: Aug. 18, 1997

[30] Foreign Application Priority Data

Aug. 20, 1996 [JP] Japan .................... 8-218557
Sep. 4, 1996 [JP] Japan .................... 8-234238

[51] Int. Cl.$^6$ .............................. G03B 5/00; G03B 13/36
[52] U.S. Cl. .......................................................... 396/80
[58] Field of Search ........................ 396/79–83, 87; 359/694, 696, 697, 698

[56] References Cited

U.S. PATENT DOCUMENTS

| | | | |
|---|---|---|---|
| 5,223,873 | 6/1993 | Tsuboi | 396/82 |
| 5,689,739 | 11/1997 | Yoshida et al. | 396/83 |
| 5,701,523 | 12/1997 | Omiya et al. | 396/83 |
| 5,732,290 | 3/1998 | Shimose et al. | 396/83 |

*Primary Examiner*—W. B. Perkey
*Attorney, Agent, or Firm*—Young & Thompson

[57] ABSTRACT

A zoom lens device has a helical movement barrel and a drive ring mounted in a fixed barrel to be rotatable about an optical axis. The helical movement barrel holds front and rear lens groups therein. The drive ring is rotated by a motor through gears. The drive ring is coupled to a helical movement barrel with a clearance in the circumferential direction, so the drive ring can rotate relative to the helical movement barrel within an angle defined by the clearance. While the drive ring rotates relative to the helical movement barrel, the rotational movement of the drive ring causes a cam barrel to move along the optical axis relative to the helical movement barrel. The axial movement of the cam barrel causes the rear lens group to move along the optical axis. When the drive ring is rotated beyond the angle defined by the clearance, the rotational movement of the drive ring causes the helical movement barrel to rotate together with the cam barrel. As the helical movement barrel moves along the optical axis while rotating, the front and rear lens groups moves along the optical axis. The rear lens group moves relative to the front lens group with the rotation of the cam barrel.

14 Claims, 18 Drawing Sheets

ZOOM LENS DEVICE

BACKGROUND OF THE INVENTION

1. Field of the Invention

The present invention relates to a zoom lens device, particularly to a zoom lens device which uses a single motor for causing at least two lens groups to move relative to each other in the direction of an optical axis both on zooming and on focusing.

2. Background Arts

U.S. Pat. No. 5,223,873 discloses a zoom lens which uses a single actuator both for zooming and for focusing. This zoom lens device is mainly constituted of a zoom ring, a pair of lens groups and a motor for rotating the zoom ring. The room ring has first and second kinds of cam grooves formed around the inner periphery. The first kind cam grooves are provided for causing the two lens groups to move relative to each other for zooming. The second kind cam grooves are provided for causing one of the lens groups to move along a different course from zooming. The second kind cam grooves extend from the first kind cam grooves in alternating fashion, so that the second kind cam grooves are used for focusing after the zoom ring is moved in one of predetermined zooming positions by the effect of the first kind cam grooves.

According to this prior art, since the first kind cam grooves for zooming and the second kind cam grooves for focusing are continued to one another, the zooming position and the focusing position are determined by the rotational angle of the zoom ring. The respective zooming positions are fixedly defined by the course of the cam grooves. It is impossible to modify the intervals between the zooming positions once the cam grooves are designed. It is of course impossible to vary the focal length continuously. Moreover, as the length of the continuous cam grooves is inevitably long, high-speed zooming is difficult.

SUMMARY OF THE INVENTION

In view of the foregoing, an object of the present invention is to provide a zoom lens device which uses a single motor for both focusing and zooming and is able to vary the focal length continuously at a high speed.

To achieve the above object, a zoom lens device according to the present invention is comprised of:

a fixed barrel mounted stationary to a camera body;

a helical movement barrel mounted in the fixed barrel so as to be movable along an optical axis while rotating about the optical axis, the helical movement barrel holding at least front and rear lens groups therein;

a drive ring mounted in the fixed barrel to be rotatable about the optical axis, the drive ring being rotated by a motor;

an interconnection device interconnecting the drive ring with the helical movement barrel, the interconnection device allowing the drive ring to rotate relative to the helical movement barrel within a predetermined relative rotation range, and transmitting the rotational movement of the drive ring to the helical movement barrel when the drive ring rotates beyond the relative rotation range;

a focusing mechanism for moving one of the front and rear lens groups along the optical axis in response to relative rotation of the drive ring to the helical movement barrel; and a zooming mechanism for moving the front and rear lens groups along the optical axis while changing the distance between the front and rear lens groups in response to rotation of the helical movement barrel caused by the rotational movement of the drive ring.

Since the zooming position is determined by the rotational amount and direction of the helical movement barrel, and the focusing position is determined by the rotational amount of the drive ring relative to the helical movement barrel, the zooming position can be changed continuously at a high speed by use of a simple control sequence. Also, the mechanical construction is simple and compact.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
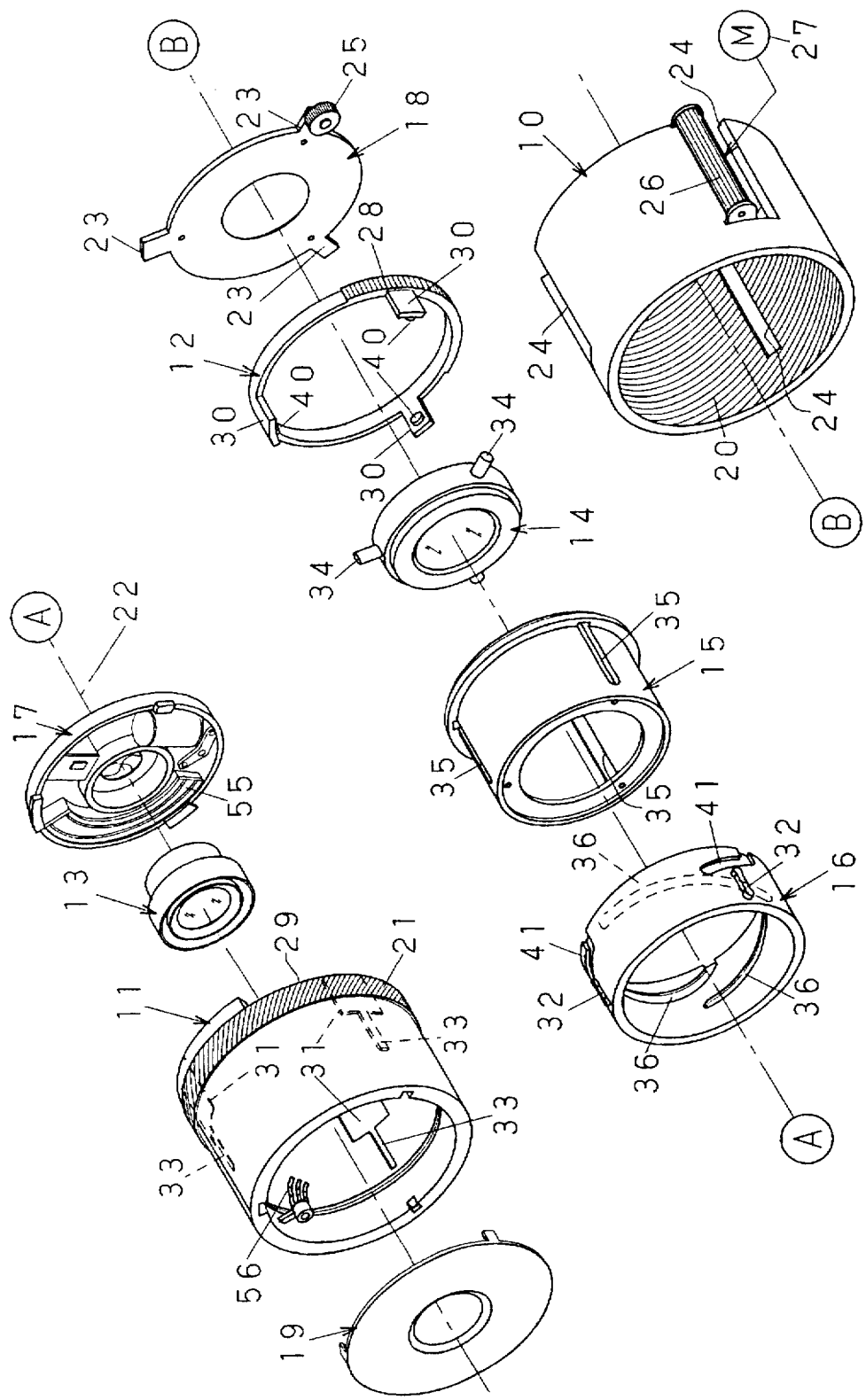
FIG. 1 is an exploded perspective view of a zoom lens device according to a first embodiment of the invention.
Figure 2:
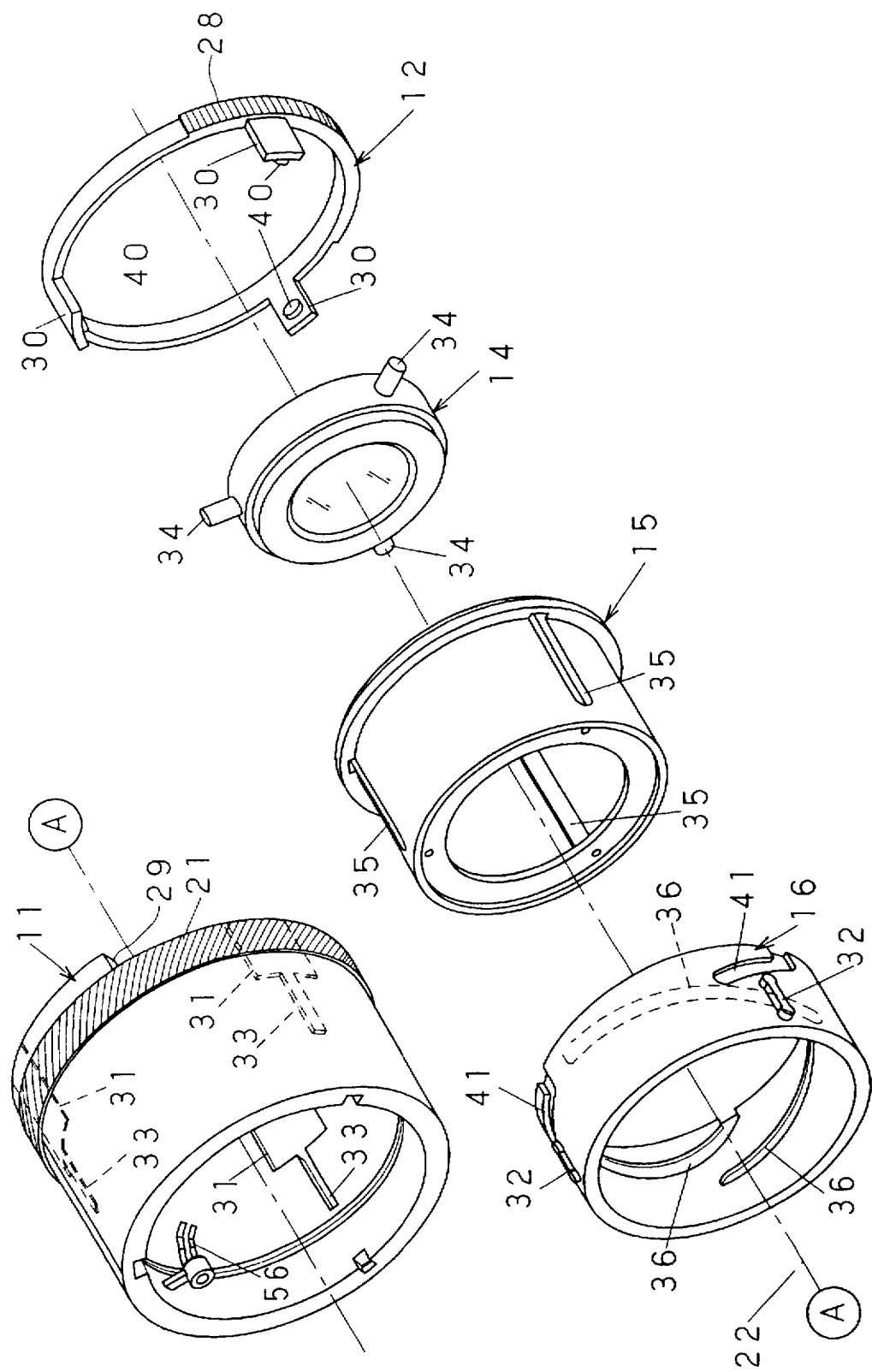
FIG. 2 is an exploded perspective view of essential parts of the first embodiment.
Figure 3:
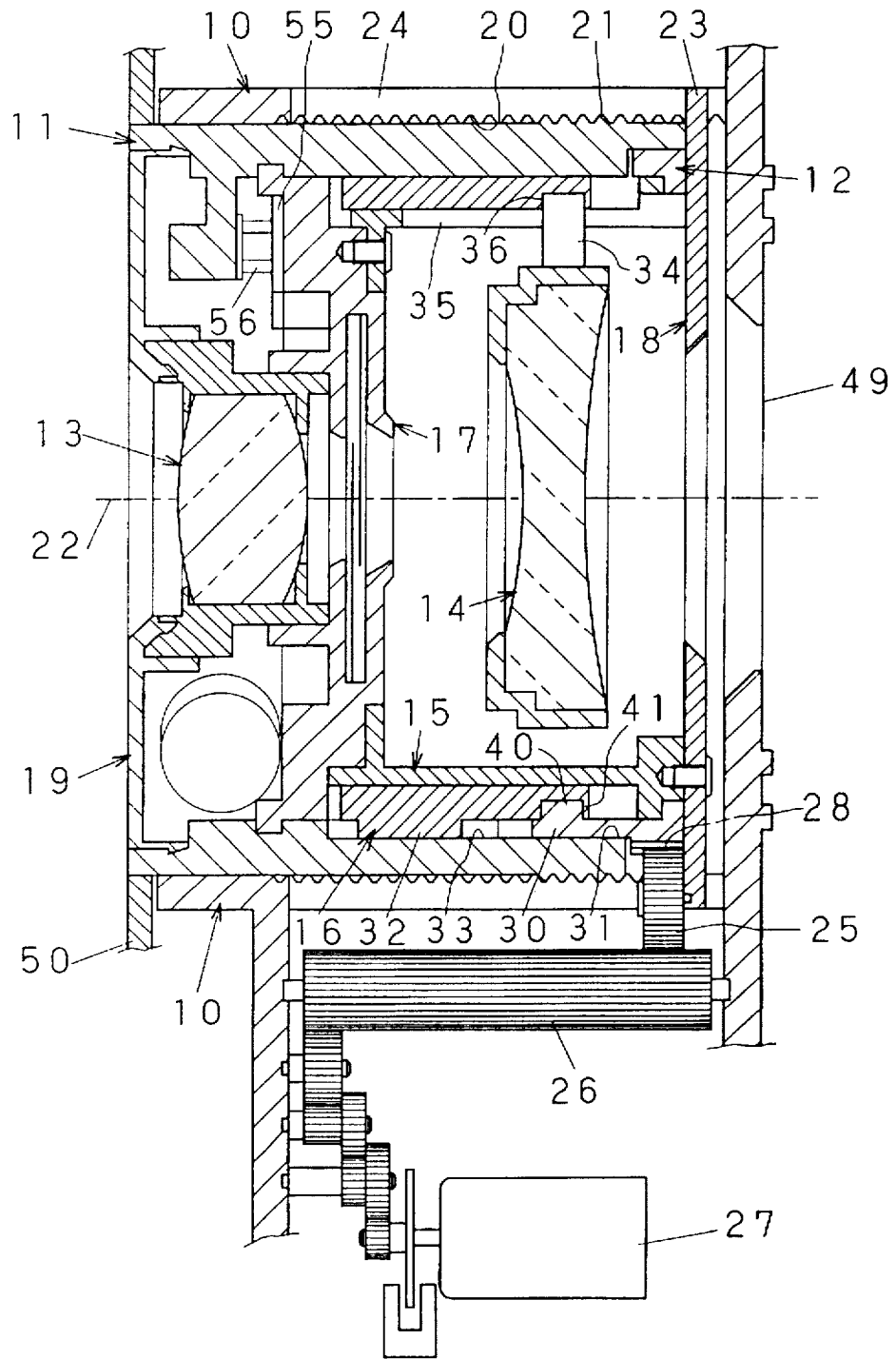
FIG. 3 is an axial sectional view of the zoom lens device of the first embodiment at a wide-angle terminal.

As shown in FIGS. 1 to 3, a zoom lens device according to a first embodiment is applied to a two component mechanical compensation type zoom lens system consisting of two lens groups. The zoom lens device is mainly constituted of a fixed barrel 10, a helical movement barrel 11, a drive ring 12, a front lens group 13, a rear lens group 14, an axial movement barrel 15, a cam barrel 16, a shutter block 17, an axial movement guide ring 18 and a decorative cover plate 19.

The fixed barrel 10 has an internal or female helicoid 20 around its inner periphery. The helical movement barrel 11 has an external or male helicoid 21 around its outer periphery, which is engaged with the internal helicoid 20 of the fixed barrel 10, so that the movable barrel can rotate inside the fixed barrel 10 about an optical axis 22 of the lens system, thereby moving in the axial direction according to the lead of the helicoids 20 and 21. The decorative cover plate 19 is attached to the front face of the helical movement barrel 11. The front lens group 13, the shutter block 17, the cam barrel 16, the axial movement barrel 15, the rear lens group 14, the drive ring 12 and the axial movement guide ring 18 are mounted in the helical movement barrel 11 in this order from the front, wherein front is the objective side, and rear is the image side.

The shutter block 17 and the axial movement guide ring 18 are secured to the front and rear of the axial movement barrel 15 respectively. The axial movement barrel 15, the shutter block 17 and the axial movement guide ring 18 are movable together relative to the helical movement barrel 11 in the direction of the optical axis 22. The axial movement guide ring 18 has three radial projections 23 formed at regular intervals around its outer circumference. The radial projections 23 are inserted in three axial slits 24 of the fixed barrel 10, so that the axial movement barrel 15 and the shutter block 17 cannot rotate inside the fixed barrel 10, while the helical movement barrel 11 is rotatable about the optical axis 22 relative to the axial movement barrel 15. The front lens group 13 is secured to the front of the shutter block 17.

A gear 25 is mounted to one of the radial projections 23 of the axial movement guide ring 18. The gear 25 is in mesh with a drive gear 26 through one of the axial slits 24 of the fixed barrel 10. The drive gear 26 transmits the rotational movement of the motor 27 to the gear 25. The drive gear 26 has a length in its axial direction that is parallel to the optical axis 22, so the gear 25 continues to engage with the drive gear 26 while the helical movement barrel 11 is moving along the axial direction.

The drive ring 12 is held between the rear face of the axial movement barrel 15 and the axial movement guide ring 18 so as to be rotatable about the optical axis 22. The drive ring 12 is formed with a gear 28 through a limited angular range of the outer periphery. The drive ring 12 also has three axial legs 30 spaced at regular intervals in the circumferential or rotational direction thereof. The axial legs 30 have the same length in the circumferential direction, and are fitted into three stepped recess portions 31 of the inner periphery of the helical movement barrel 11 which are arranged in correspondence with the axial legs 30. The stepped recesses 31 have a length in the circumferential direction of the helical movement barrel 11, that is greater than the circumferential length of the axial legs 30, so that the axial legs 30 are movable inside the stepped recesses 31 in the circumferential direction. That is, the drive ring 12 is coupled to the helical movement barrel 11 with a clearance so as to be rotatable relative to the helical movement barrel 11 through a limited angle that corresponds to the clearance, i.e. the movable range of the axial legs 30 within the stepped recesses 31. A cutout 29 is formed in the rear end of the helical movement barrel 11 in correspondence with the gear 28, for allowing the gear 25 to access to the gear 28. In this way, the motor 27 can rotate the drive ring 12 through the gears 26, 25 and 28.

The cam barrel 16 is fitted onto the axial movement barrel 15 such that the cam barrel 16 is rotatable about the optical axis 22 and movable along the optical axis 22 on the axial movement barrel 15. The cam barrel 16 has three axial guide ridges 32 on its outer periphery spaced at regular intervals in the circumferential direction. The axial guide ridges 32 are engaged in three axial guide grooves 33 which are formed the inner periphery of the helical movement barrel 11 in correspondence with the axial guide ridges 32. As the axial guide grooves 33 are longer in the axial direction than the axial guide ridges 32, but substantially equal in width to the axial guide ridges 32, the cam barrel 16 is movable along the optical axis 22 relative to the helical movement barrel 11, but rotates together with the helical movement barrel 11.

The axial movement barrel 15 holds the rear lens group 14 therein. The rear lens group 14 has three cam pins 34 protruding radially outwardly from a holder or frame of the rear lens group 14. The cam pins 34 are spaced at regular intervals in the circumferential direction, and are engaged in three cam grooves 36 through three axial guide slits 35 of the axial movement barrel 15, so that the rotation of the cam barrel 16 causes the pins 34 to move along the cam grooves 36. The cam grooves 36 are helical about the optical axis 22 and are parallel to each other. According to this configuration, when the helical movement barrel 11 rotates, the rear lens group 14 moves along the optical axis 22 inside the axial movement barrel 15, that is, inside the helical movement barrel 11, while being stopped from rotating by the axial guide slits 35. In this way, the rear lens group 14 moves in the axial direction relative to the front lens group 13, thereby varying the distance to the front lens group 13.

Figure 4:
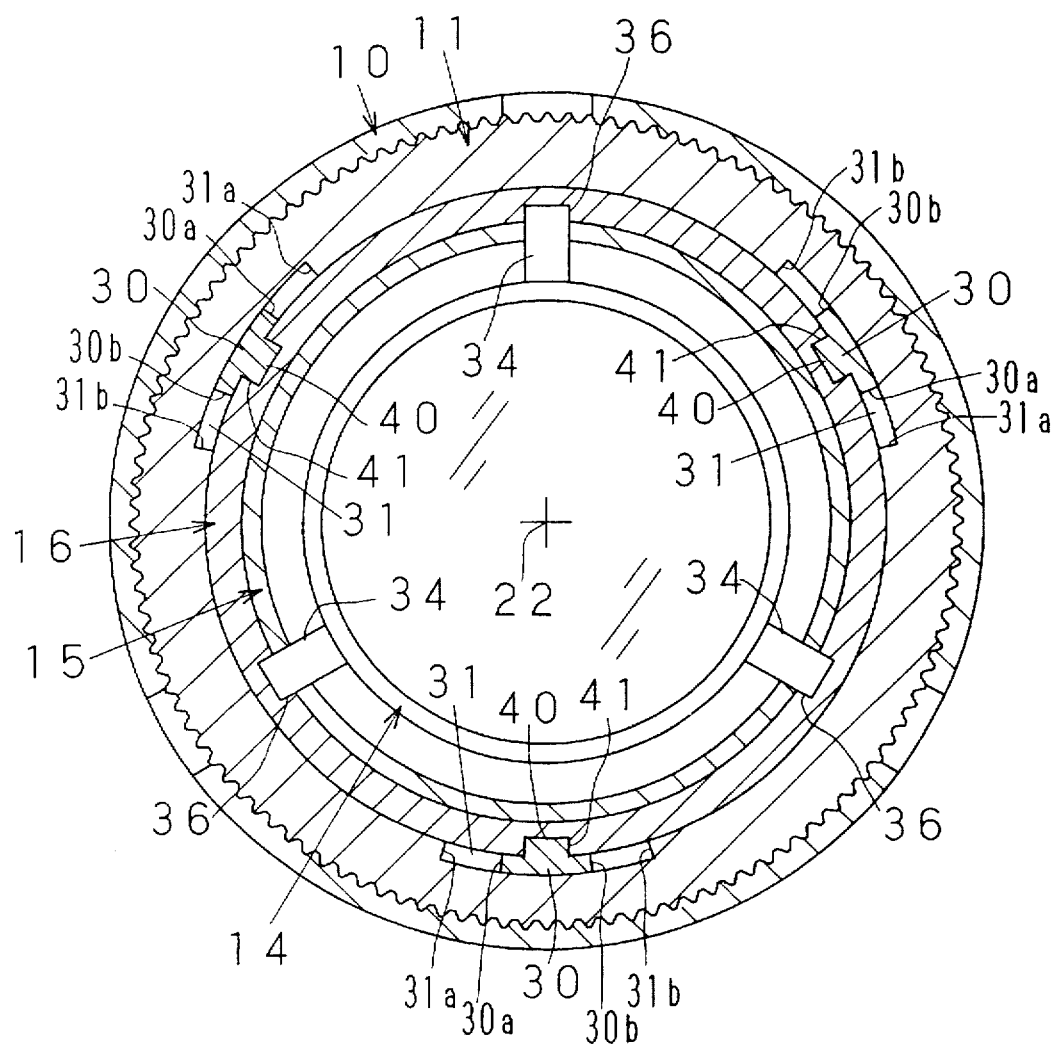
FIG. 4 is a radial sectional view of the zoom lens device of the first embodiment viewed from the film surface side.

For zooming, the drive ring 12 is rotated by the motor 27 more than the given rotational angle allowed for the relative rotation of the drive ring 12 to the helical movement barrel 11. As shown in detail in FIGS. 4 and 5, when the drive ring 12 rotates relative to the helical movement barrel 11, one side edges 30a or 30b of the axial legs 30 finally come into contact with one side walls 31a or 31b of the stepped recesses 31. Thereafter, further rotation of the drive ring 12 is transmitted to the helical movement barrel 11, causing the helical movement barrel 11 to rotate together. The rotation of the helical movement barrel 11 causes the helical movement barrel 11 to move along the optical axis 20 in accordance with the lead of the helicoids 20 and 21. The front lens group 13 is moved in the axial direction together with the helical movement barrel 11, and the cam barrel 16 is rotated together with the helical movement barrel 11. The rotation of the cam barrel 16 causes the rear lens group 14 to move in the axial direction relative to the helical movement barrel 11 because of the engagement of the cam pins 34 in the cam grooves 36 through the axial guide slits 35. In this way, the axial positions of the rear lens group 14 and the front lens group 13 are changeable to vary the focal length of the zoom lens continuously.

Figure 7:
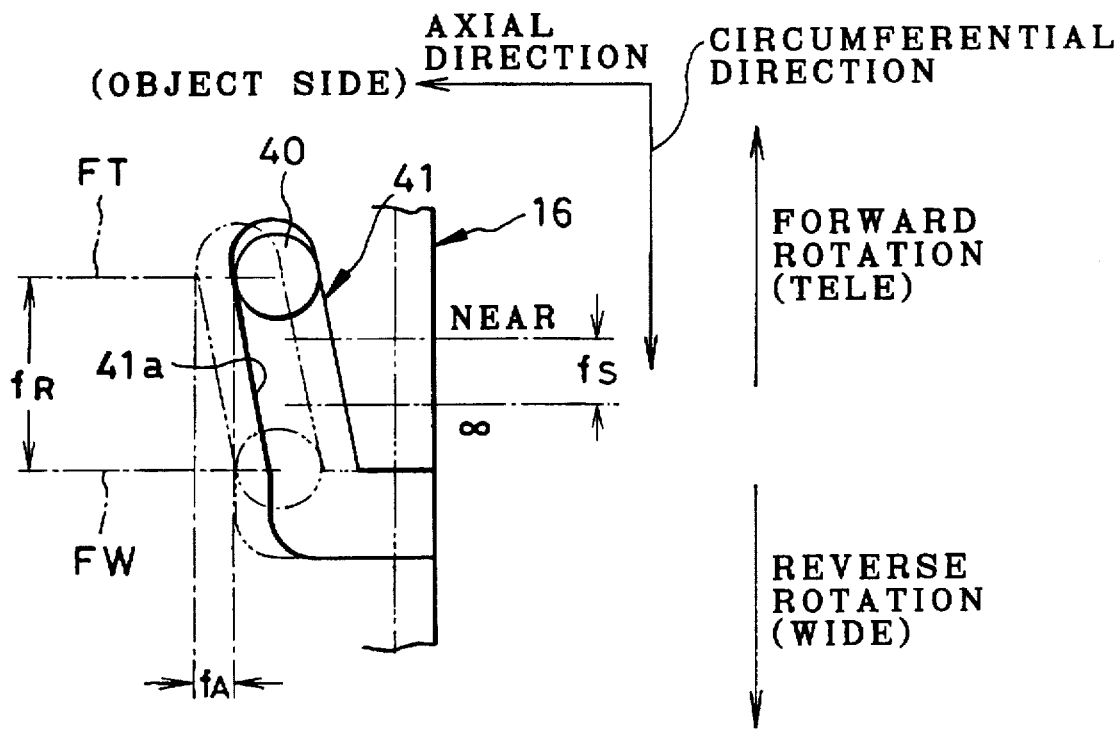
FIG. 7 is an explanatory view illustrating relationship between a cam projection of the drive ring and a focusing cam groove of the cam barrel.
Figure 6:
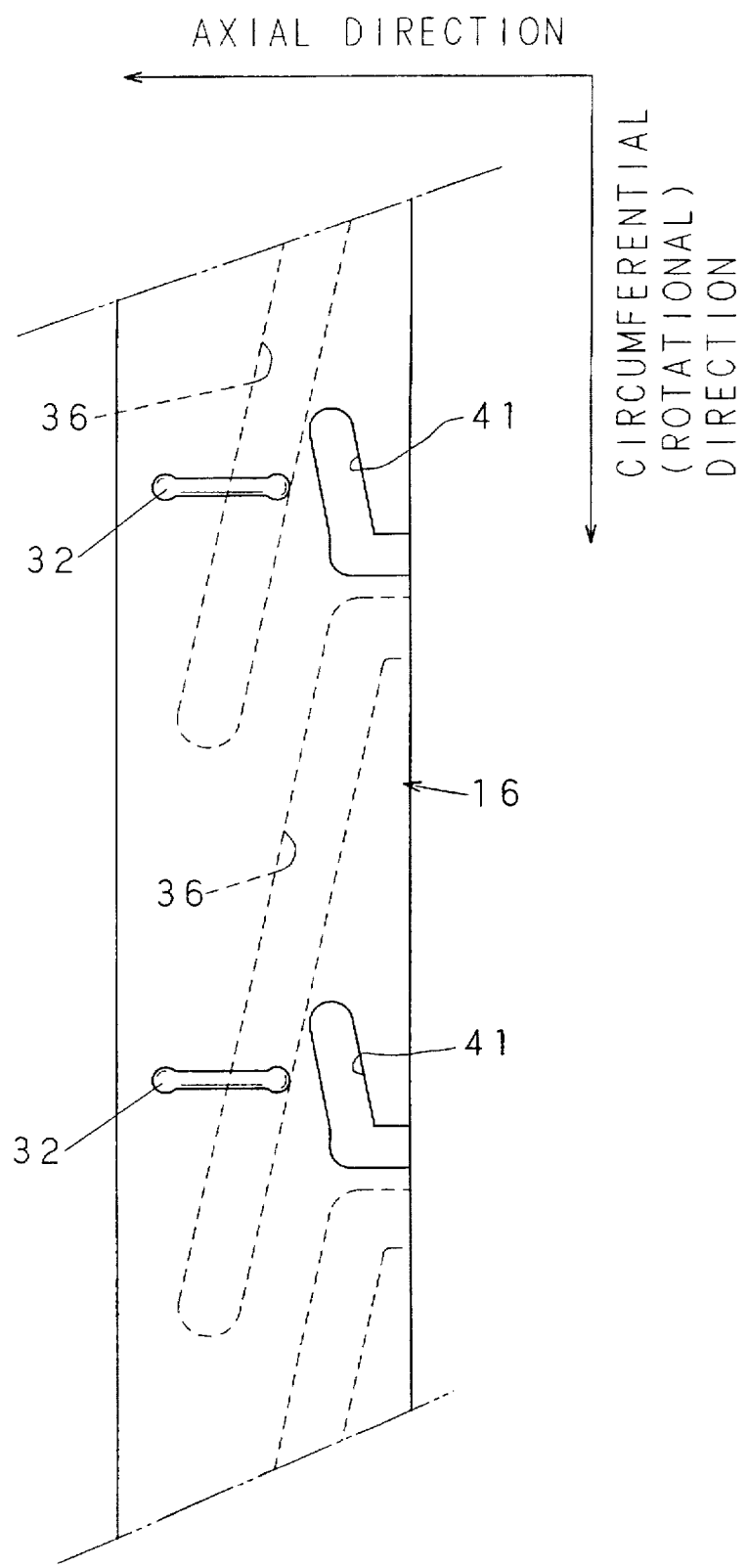
FIG. 6 is an unfolded view of a cam barrel viewed from the outer periphery.

Cam projections 40 are formed integrally on the inside surfaces of the respective axial legs 30. The cam projections 40 are engaged in three focusing cam grooves 41 which are formed around the outer periphery of the cam barrel 16 at regular intervals. As shown in detail in FIG. 6, the focusing cam grooves 41 are also helical about the optical axis 22 but have different courses from those of the cam grooves 36. For focusing, the drive ring 12 is rotated relative to the helical movement barrel 11 within the limited angular range that is determined by the movable range fR of the axial legs 30 within the stepped recesses 31. Hereinafter, the limited angular range determined by the movable range fR will be referred to as the relative rotation range of the drive ring 12 to the helical movement barrel 11. With the relative rotation of the drive ring 12 to the helical movement barrel 11, the cam projections 40 moves along the focusing cam grooves 41, as shown in FIG. 7.

Indeed the cam projections 40 apply forces to the cam grooves 41 both in the circumferential direction and in the axial direction, but the force necessary for rotating the helical movement barrel 11 is so large that the helical movement barrel 11 is not moved by the force applied in the circumferential direction to the cam grooves 41. So the cam barrel 16 is hindered from rotating because of the engagement between the axial guide ridges 32 of the cam barrel 16 and the axial guide grooves 33 of the helical movement barrel 11. Therefore, so long as the axial legs 30 move within the stepped recesses 31 and thus the driving force is applied only from the cam projections 40 to the cam grooves 41, the cam barrel 16 is moved only in the axial direction, and thus the focal length does not vary. With the axial movement of the cam barrel 16, the cam grooves 36 push the cam pins 34 in the axial direction, so that the rear lens group 14 moves in the axial direction. In this way, the rear lens group 14 alone is moved for focusing while the drive ring 12 alone is rotated.

Figure 8:
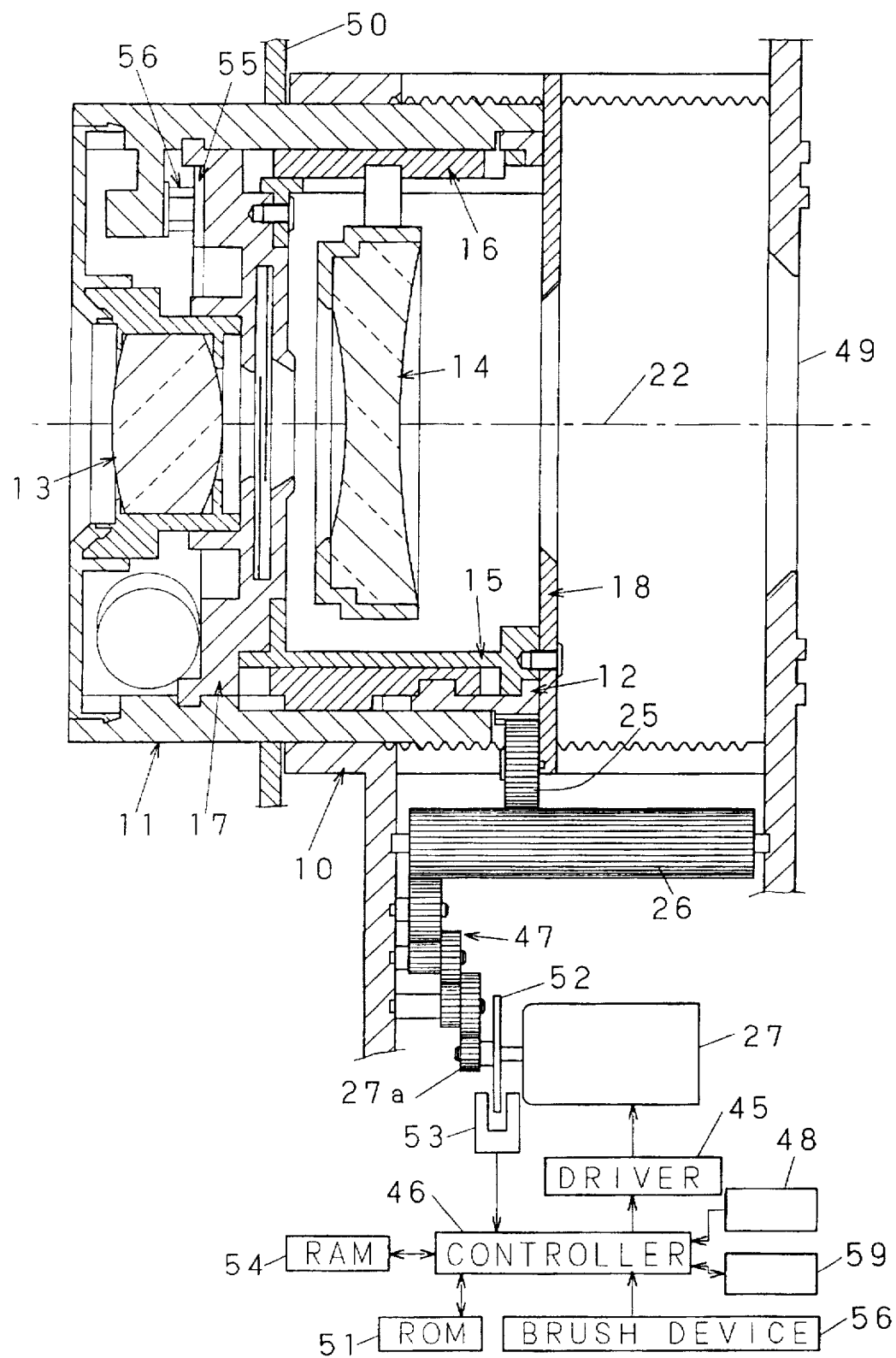
FIG. 8 is an axial sectional view of the zoom lens device of the first embodiment at a telephoto terminal.

As shown in FIG. 8, the motor 27 is driven by a controller 46 through a driver 45. There is a reduction gear train 47 from a drive shaft gear 27a of the motor 27 to the drive gear 26. The controller 46 controls zooming by driving the motor 27 in response to a zooming switch provided in a console 48. The zooming switch includes a telephoto zooming button for changing the focal length to the telephoto side, and a wide-angle zooming button for changing the focal length to the wide-angle side. In FIGS. 3 and 8, designated by 49 and 50 are a film surface and a front wall of the camera body respectively. The controller 46 controls zooming, focusing and exposure according to a sequence program stored in a ROM 51.

An encoder wheel 52 having radial slits is mounted on the drive shaft of the motor 27, so as to rotate together with the drive shaft. A photosensor 53 is disposed in the course of the encoder wheel 52, to detect the slits of the encoder wheel 52 and output an encoder pulse signal to the controller 46. The controller 46 determines rotational angle of the motor 27 based on the encoder pulse signal. The controller 46 controls start and stop of the motor 27 with reference to the rotational angle.

As described so far, according to the configuration of the present invention, it is possible to vary the focal length continuously. However, it is preferable to predetermine a plurality of zooming positions at appropriate intervals so as to make the focusing control simple enough for practical use. For brevity sake, the following description will be based on an example where there are three zooming positions predetermined between a telephoto terminal and a wide-angle terminal, through it is possible to provide more than three zooming positions between the terminals.

On the front face of the shutter block 17, there is a semi-circular code plate 55. A brush device 56 is secured to an inner front portion of the helical movement barrel 11, such that the brush device 56 slides or brushes on the code plate 55 with the rotation of the helical movement barrel 11. As shown in detail in FIG. 9, the brush device 56 has a pair of signal brushes 56a and 56b and an earth brush 56c. Correspondingly, the code plate 55 consists of an earth contact pattern GRD and three signal contact patterns E0, E1 and E2. Therefore, the contact positions of the brushes 56a to 56c on the code plate 55 correspond to a rotational position of the helical movement barrel 11. The brush device 56 and the code plate 55 constitute a zooming position detector.

Figure 9:
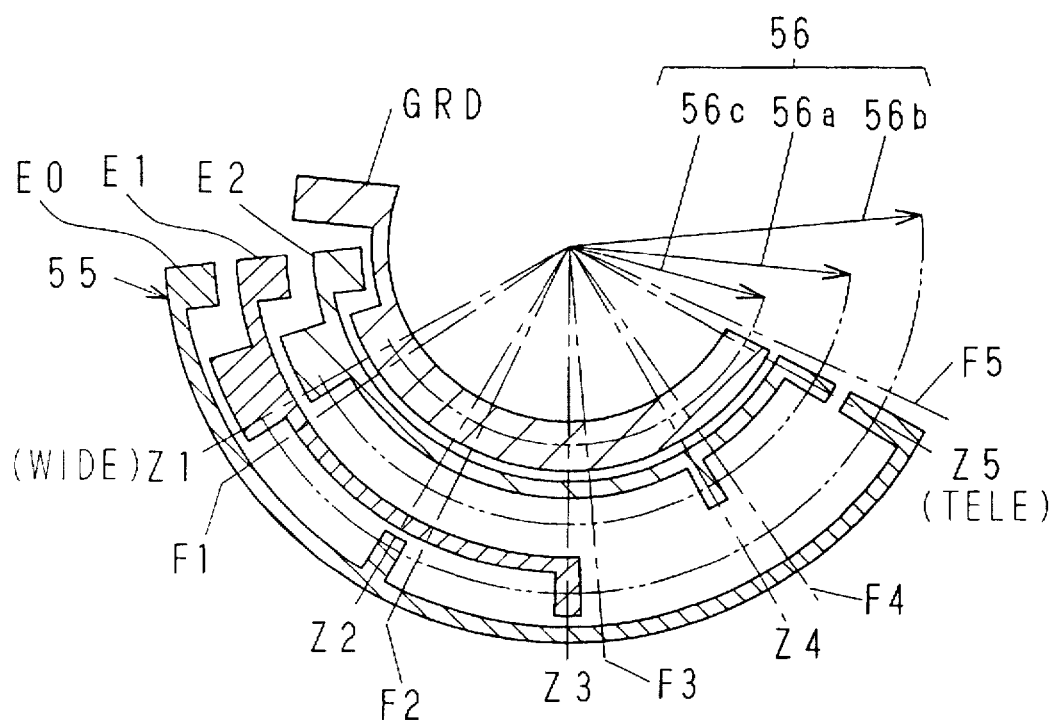
FIG. 9 is an explanatory plan view of a code plate and a brush device constituting a zooming position detector.

In FIG. 9, contact positions Z1, Z2, Z3, Z4 and Z5 of the brush device 56 on the code plate 55 correspond to the predetermined zooming positions, wherein the position Z1 corresponds to the wide-angle terminal, and the position Z5 corresponds to the telephoto terminal. That is, the brushes 56a to 56c are placed in one of the positions Z1 to Z5 when the helical movement barrel 11 moves in a corresponding one of the predetermined zooming positions. The signal contact patterns E0 to E2 are designed such that a different code is provided at each of the zooming positions Z1 to Z5. As the code signals generated from the signal brushes 56a and 56b at each zooming position is different from one another, the controller 46 can identify the present zooming position. According to this configuration, it is also possible to detect any deviation from these predetermined zooming positions that may be caused by an external force applied to the helical movement barrel 11, and determine the direction of the deviation. Therefore, the zooming positions Z1 to Z5 are served as standby positions where the zooming lens is always placed at by the zooming prior to the focusing, and then returned to after the exposure.

For zooming, the controller 46 drives the motor 27 to rotate in forward or reverse direction depending upon whether the telephoto zooming button or the wide-angle zooming button is operated. If at least one of the signal brushes 56a and 56b is in contact with any of the signal contact patterns E0 to E2 and outputs an ON-signal when the operation of the zooming switch is terminated, then the controller 26 stops the motor 27 immediately, as the zooming lens is placed one of the predetermined zooming positions Z1 to Z5 at that time. if both of the signal brushes 56a and 56b do not output an ON-signal when the operation of the zooming switch is terminated, then the controller 26 continues to drive the motor 27 until an ON-signal is generated from either of the signal brushes 56a and 56b. After positioning the zoom lens at one of the predetermined zooming positions Z1 to Z5 in this way, the controller 46 identifies the present zooming position with the code signals detected from the signal contact patterns E0 to E2 through the brush device 56. Data of the present zooming position is stored in a RAM 54. In this way, the helical movement barrel 11 always stops after the zooming at one of the rotational positions corresponding to the predetermined zooming positions Z1 to Z5 wherein identification data of the zooming position can be obtained.

For focusing, it is desirable for accurate focusing to detect the position of the cam barrel 16 in the axial direction at the end of zooming prior to the focusing. However, in order to cut the cost, the above-described zooming position detector may double as an initial focusing position detector, in the way as set forth below.

Specifically, the helical movement barrel 11 is rotated from the present zooming position in one direction, e.g. to the telephoto side in this instance, by such an amount that the signal brushes 56a and 56b are put out of contact with the signal contact patterns E0 to E2. For example, when the signal level from either of the signal brushes 56a and 56b inverts from ON to OFF, the controller 46 starts counting pulses up to a predetermined number, which will be referred to as the pulse number for initial focusing position. The controller 46 stops the motor 27 when counting up to the predetermined number. As a result, the brush device 56 is placed at one of predetermined initial focusing positions F1 to F5, that is the nearest one to the preceding zooming position.

In the respective initial focusing positions, the cam projections 40 is placed at a terminal position FT of the focusing cam groove 41, as shown in FIG. 7, so that the cam barrel 16 is placed at its rearmost position in the range of its axial movement, that is, the nearest position to the film surface 49. In this embodiment, the pulse number for initial focusing position is constant regardless of the zooming position, and is previously stored in the ROM 51. In this way, the zoom lens is positioned at one of the initial focusing positions F1 to F5 without the need for providing a specific position detector separately from the zooming position detector consisting of the code plate 55 and the brush device 56.

After the helical movement barrel 11 and thus the cam barrel 16 are rotated to the initial focusing position in the way as above, the controller 46 starts focusing. First, responsive to a half-depression of the shutter button, a range finding section 59 detects a subject distance, and a pulse number for focusing is read out from the ROM 51 in correspondence with the subject distance. Since the amount of axial movement of the rear lens group 14 necessary for focusing varies even on the same subject distance depending upon the zooming position, the ROM 51 stores a plurality of tables or curves showing different relationships between the subject distance and the pulse number from one predetermined zooming position to another.

The controller 46 rotates the motor 27 in the opposite direction, i.e. in the direction to rotate the helical movement barrel 11 to the wide-angle side in this instance, by an angle that corresponds to the pulse number determined by the subject distance. The rotational angle for focusing is always confined to the relative rotation range of the drive ring 12 to the helical movement barrel 11, i.e. the movable range fR of the axial legs 30 within the stepped recesses 31.

After the focusing, the controller 46 controls the exposure based on a subject brightness upon a full-depression of the shutter button. Thereafter, the controller 46 rotates the helical movement barrel 11 back to one of the zooming positions Z1 to Z5, as set force above. The controller 46 always monitors the present zooming position with reference to the code signals detected from the signal contact patterns E0 to E2 through the brush device 56, and write the position data in the RAM 54. If the controller 46 detects a deviation from the predetermined zooming position, the controller 46 rotates the helical movement barrel 11 in one predetermined direction, and determines the direction of the deviation on the basis of the ON-OFF pattern of the code signals obtained thereafter. Then, the controller 46 rotates the helical movement barrel 11 again so as to return the helical movement barrel 11 to the receding zooming position.

As described above, the cam pins 34 of the rear lens group 14 are engaged in the axial guide slits 35 of the axial movement barrel 15 and the am grooves 36 of the cam barrel 16, such that the rear lens group 14 moves along with the movement of cross points between the cam grooves 36 and the axial guide slits 35 that is caused by the rotation of the cam barrel 16 with the helical movement barrel 11. The cam pins 34 cannot smoothly move along the cam grooves 36 if the pressure angle of the cam grooves 36 is too large, the pressure angle being formed between a normal line of the cam surface of each cam groove 36 and the circumferential direction about the optical axis 22. Smooth and equal movement of the cam pins 34 along the cam grooves 36 will be still more difficult if the production accuracy or the assembling accuracy of any of the cam pins 34, the axial guide slits 35 and the cam grooves 36 is not sufficient. If the movement of the cam pins 34 is not smooth, the load on the motor 27 increases so much that the motor 27 cannot rotate any more. One option to prevent this problem is to use a high power motor, but the high power motor is expensive.

In addition, as described above, the cam grooves 36 are designed to push the cam pins 34 in the axial direction to move only the rear lens group 14 in the axial direction for focusing, while the cam barrel 16 moves in the axial direction without rotating. Although the force applied from the cam pins 40 to the focusing cam grooves 41 is not so large enough to cause the cam barrel 16 and the helical movement barrel 11 to rotate, the reactive force applied from the cam pins 34 to the cam grooves 36 also acts in the circumferential direction as well as in the axial direction. Therefore, it is necessary to design such that the component of the force applied to the grooves 36 in the circumferential direction during focusing would not causes the cam barrel 16 and the helical movement barrel 11 to rotate.

For this purpose, it is preferable to form the cam pins 34 to be resiliently bendable at least at one of two peripheral portions contacting side walls or cam surfaces 36a and 36b of the cam groove 36. According to an embodiment shown in FIGS. 10 and 11, a bendable or resilient portion 60 is formed integrally in a tip of the cam pin 34, which is fitted in the cam groove 36. The bendable portion 60 is constituted of a cavity 60a and a resilient free end 60b formed by the cavity 60a. The free end 60b is arced along the periphery of the cam pin 34, and is in contact with the cam surface 36b, so that the cross section of the bendable portion 60 looks like the character "C". The free end 60b is bent inwardly, as shown by phantom lines in FIG. 11, when the cam pin 34 is pushed by the cam groove 36.

In this embodiment, only an area of the cam pin 34 that contacts the cam surface 36b is formed to be bendable. This is because the cam grooves 36 always push the cam pins 34 in one direction as shown by an arrow Y in FIG. 11. That is, only the cam surfaces 36b apply force to the bendable portion 60 during focusing. When the free end 60b is resiliently bent inwardly, the friction between the cam pin 34 and the cam surface 36b increases, so that the cam pin 34 gets less easy to slide along the cam surface 36b. Thereby, the force applied in the direction to rotate the cam barrel 16 is canceled, facilitating the axial movement of the cam barrel 16 and ensuring the axial movement of the rear lens group 14 for focusing. When the cam barrel 16 stops, the free ends 60b resiliently return to the initial position as shown by solid line in FIG. 11, wherein the bendable portions 60 of the cam pins 36 are nipped between the cam surfaces 36a and 36b.

Figure 10:
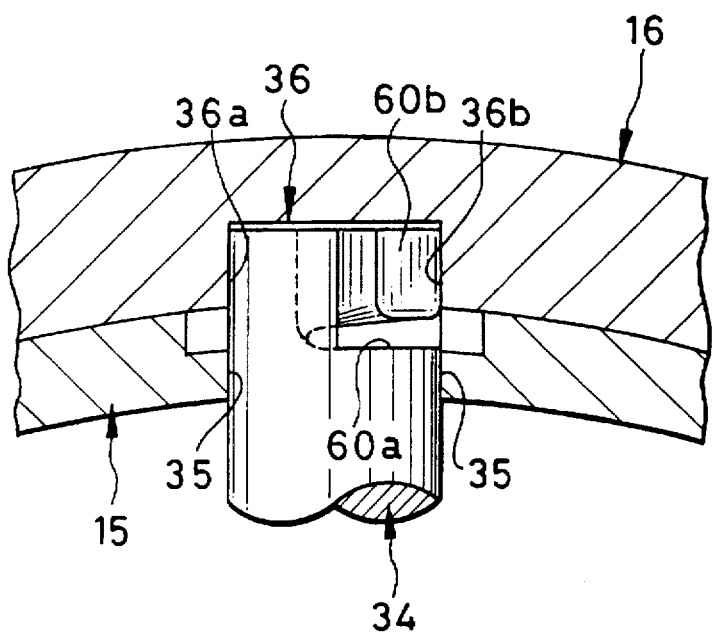
FIG. 10 is an enlarged view of a cam pin with a bendable portion.
Figure 11:
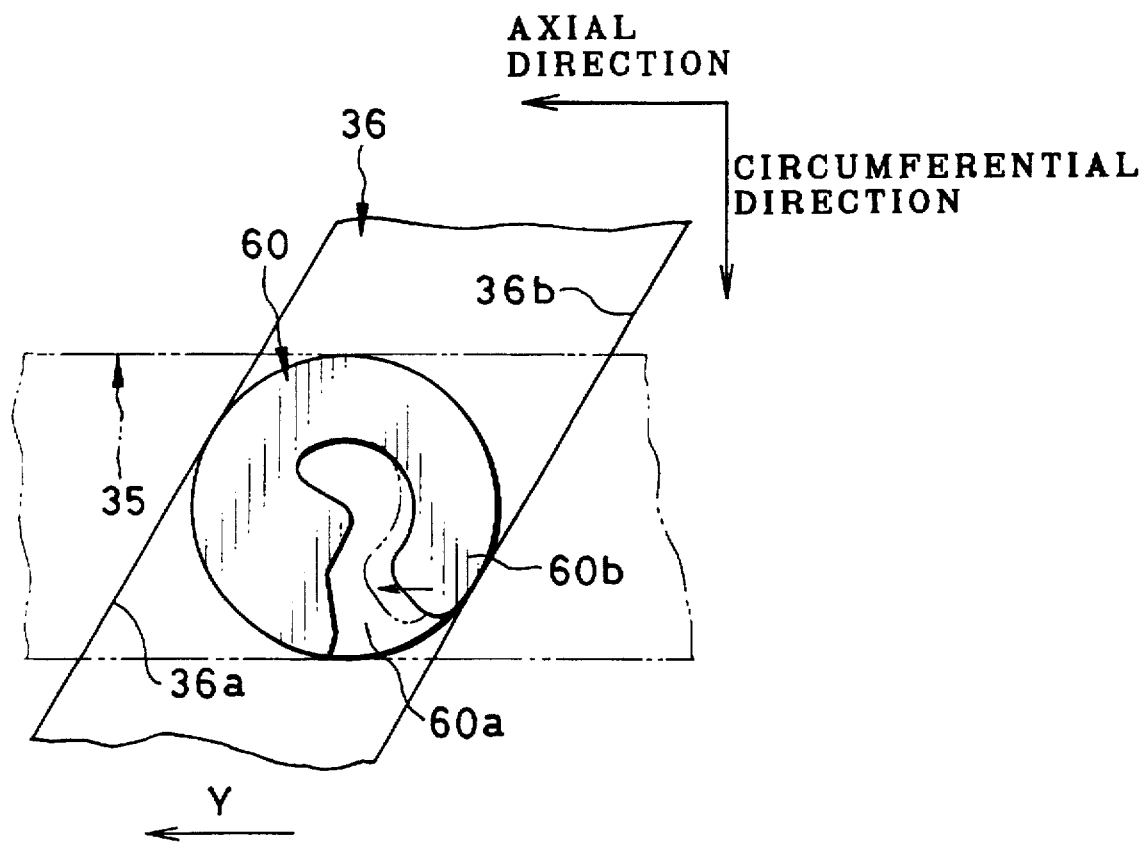
FIG. 11 is an explanatory view of the cam pin with the bendable portion viewed from the tip of the cam pin.

Those portions of the cam pins 34 which are fitted in the axial guide slits 35 are not formed bendable. The axial edges of the axial guide slits 35 are stepped on the outer periphery side of the axial movement barrel 15, as shown in FIG. 10, so the edges of the axial guide slits 35 do not contact the bendable portions 60.

Figure 12:
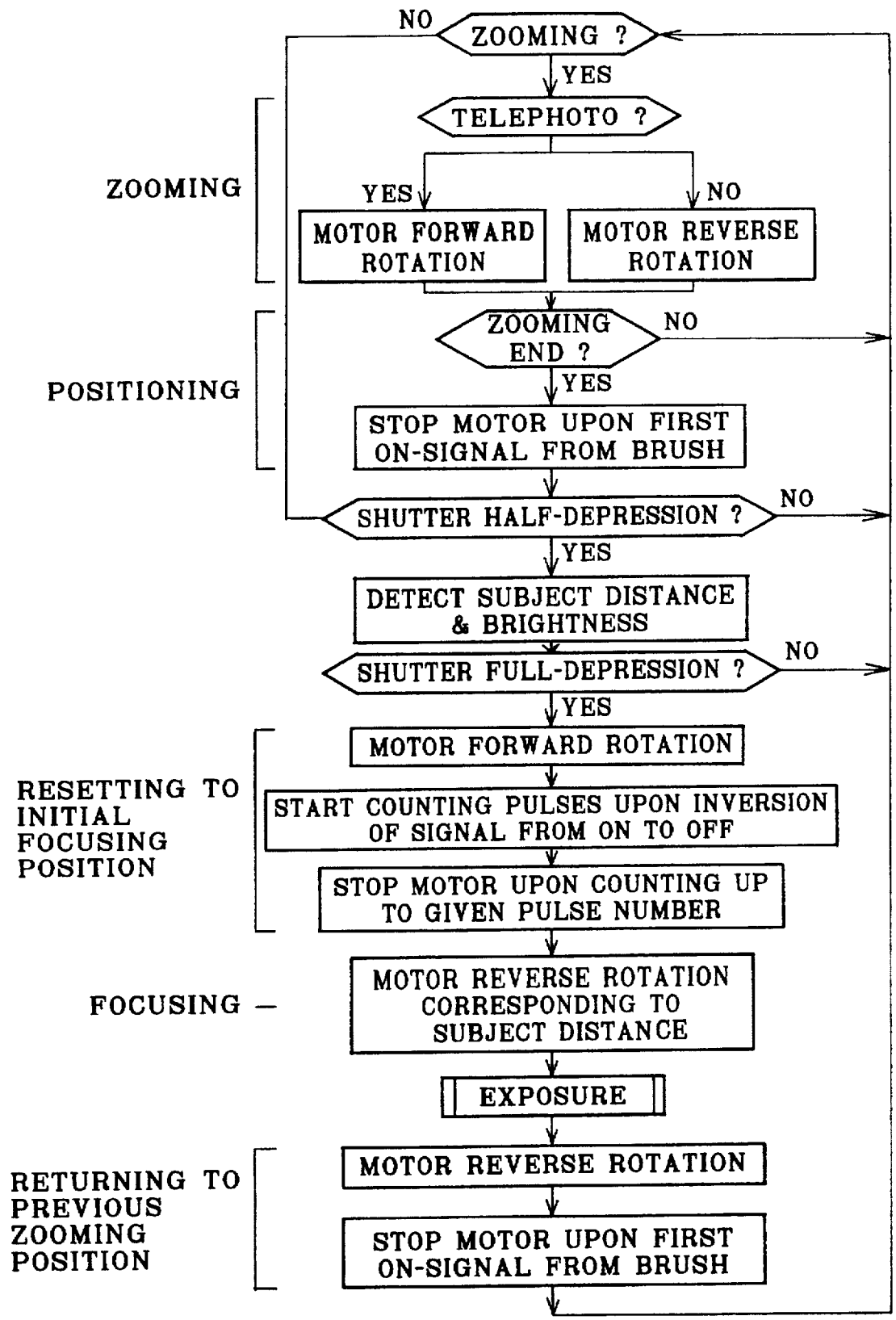
FIG. 12 is a flow chart illustrating an operation sequence of the zoom lens device of the first embodiment.

The operation of the zoom lens having the above configurations will be described with reference to FIGS. 12 and 13.

Zooming is first carried out from the wide-angle terminal toward the telephoto terminal. When the telephoto zooming button is operated, the controller 46 drives the motor 27 to rotate in the forward direction beyond the relative rotation range of the drive ring 12 to the helical movement barrel 11. Thereby, one axial edges 30a of the axial legs 30 get into contact with the side walls 31a of the stepped recesses 31, and push the helical movement barrel 11 to rotate in the direction to cause the helical movement barrel 11 to move forward, i.e. to the objective side.

When the operation of the telephoto zooming button is terminated, the controller 46 monitors the code signals from the signal contact patterns E0 to E2. If either of the signals output from the signal brushes 56a and 56b takes ON level, the controller 46 stops driving the motor 27 immediately. If not, the motor 27 continues being driven in the forward direction till either of the signal brushes 56a and 56b is brought into contact with any of the signalc contact patterns E0 to E2 and thus outputs an ON-signal. While the helical movement barrel 11 is rotated by the forward rotation of the motor 27, the brush device 56 moves in a counterclockwise direction of FIG. 9.

Figure 5:
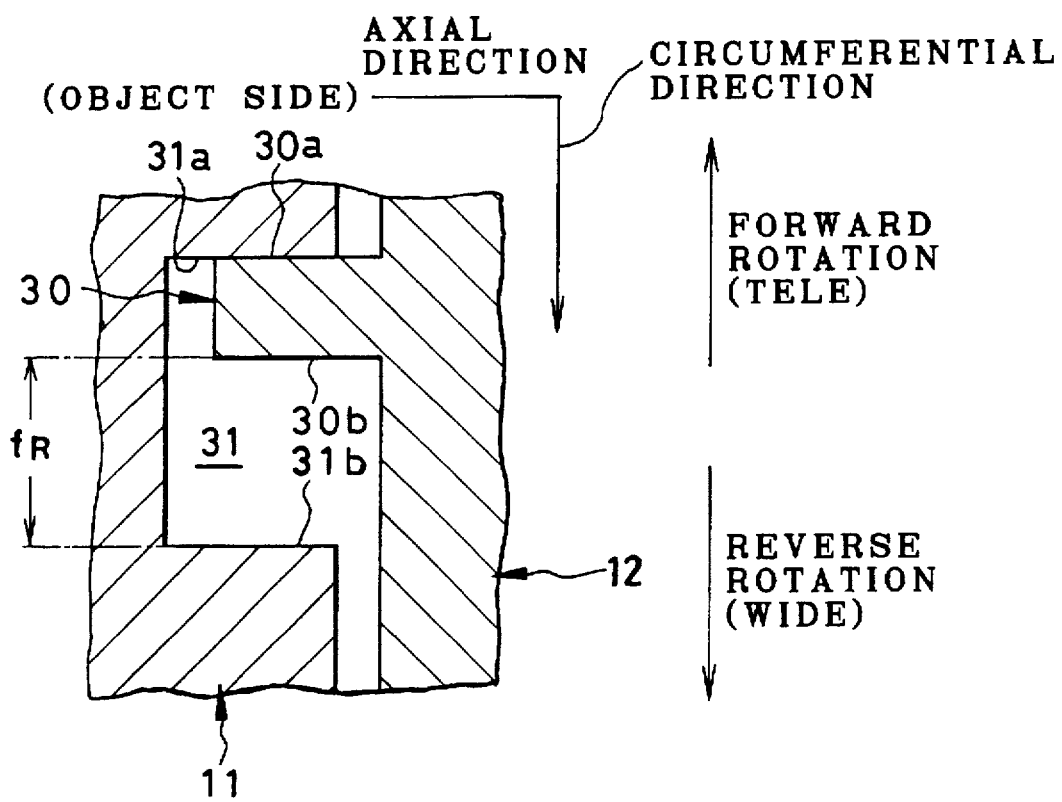
FIG. 5 is an explanatory view illustrating a relative rotation range of a drive ring to a helical movement barrel.

The code signals obtained from the signal contact patterns E0 to E2 at the stop of the motor 27 is written as zooming position data in the RAM 54. When the zooming to the telephoto side is accomplished in this way, the axial edges 30a of the axial legs 30 are in contact with the side wall 31a of the stepped recesses 31, as shown in FIG. 5. On the other hand, the cam projections 40 are located at the terminal position FT in the focusing cam grooves 41, as shown by solid line in FIG. 7.

When the shutter button is depressed halfway, the controller 46 activates the range finding section 59 to measure a subject distance. According to the subject distance and the present zooming position, a pulse number for focusing is read out from the ROM 51. Also the constant pulse number for initial focusing position is read out from the ROM 51. These pulse numbers are written in the RAM 54.

When the photographer further depresses the shutter button to the full, the controller 46 drives the motor 27 to rotate forward. Since the axial legs 30 are still in contact with the side walls 31a of the stepped recesses 31, the forward rotation of the motor 27 is immediately transmitted to the helical movement barrel 11 through the drive ring 12, and makes the helical movement barrel 11 to rotate in the direction to move forward, i.e. to the telephoto side.

As a result, the brush device 56 is shifted from one of the zooming positions Z1 to Z5 to the telephoto side. As soon as any of the signal levels detected from the signal contact patterns E0 to E2 inverts from ON to OFF, the controller 46 decelerates the forward rotation of the motor 27, and drives the motor 27 further in the forward direction at a low speed by the pulse number for initial focusing position, and then stops the motor 27. When the motor 27 stops, the brush device 56 is placed in one of the initial focusing positions F1 to F5.

Thereafter, the pulse number for focusing is read out from the RAM 54, and the motor 27 is driven in the reverse direction by this pulse number. Indeed the reverse rotation of the motor 27 corresponds to the rotational direction of the helical movement barrel 11 to move backward, i.e. to the wide-angle side, but the rotational angle corresponding to the pulse number for focusing is always less than the relative rotation range of the drive ring 12 to the helical movement barrel 11. Therefore, the helical movement barrel 11 is not rotated at that time. Only the drive ring 12 is rotated by the reverse rotation of the motor 27, thereby causing the cam projections 40 to move from the terminal position FT toward another terminal position FW of the focusing cam grooves 41, as shown in FIG. 7.

As the cam projections 40 moves toward the terminal position FW, the cam projections 40 push a forward edge 41a of the focusing cam grooves 41. Because of the engagement between the axial guide ridges 32 with the axial guide grooves 33, the cam barrel 16 is moved forward along the optical axis 22 while the helical movement barrel 11 is maintained stationary. Accordingly, the cam projections 40 and thus the cam barrel 16 are moved by an amount corresponding to the determined pulse number for focusing, into a focusing position corresponding to the subject distance. As shown in FIG. 7, for focusing, the cam projections 40 moves within an intermediate section fs of the focusing cam grooves 41. In FIG. 7, fA represents the range of axial movement of the cam barrel 16 relative to the helical movement barrel 11 that is caused by the relative rotation of the drive ring 14 to the helical movement barrel 11, and thus corresponds to the movable range fR of the axial legs 30 within the stepped recesses 31.

The axial movement of the cam barrel 16 causes the cam pins 34 to move in the axial direction together with the cam barrel 16, because of the engagement of the cam pins 34 in the cam grooves 36 and the axial guide grooves 35. In this way, the rear lens group 14 is moved forward with the cam barrel 16 to make focusing from a nearest range toward an infinity range.

If the wide-angle zooming button is operated to shift the focal length to the wide-angle side before the shutter button is operated, the motor 27 is rotated reversely to rotate the drive ring 12 beyond the relative rotation range to the helical movement barrel 11, i.e., the movable range fR of the axial legs 30 within the stepped recesses 31. Thereby, the axial legs 30 get into contact with the side walls 31b of the stepped recesses 31, and push the helical movement barrel 11 to rotate in the direction to move to the wide-angle side. As the axial legs 30 are brought in contact with the side walls 31b, the cam projections 40 are moved to the opposite terminal position FW in the focusing cam grooves 41, so that the cam barrel 16 is rotated together with the helical movement barrel 11, to move together to the wide-angle side relative to the axial movement barrel 15.

When the operation of the wide-angle zooming button is terminated, the motor 27 is driven further in the reverse direction till the brush device 56 detects an ON-signal, as soon as either of the signal brushes 56a and 56b comes into contact with any of the signal contact patterns E0 to E2. As a result, the helical movement barrel 11 is placed in one of the predetermined zooming positions Z1 to Z5. While the helical movement barrel 11 is rotated by the reverse rotation of the motor 27, the brush device 56 moves on the code plate 55 in a clockwise direction of FIG. 9.

Thereafter when the shutter button is depressed, the motor 27 is rotated in the forward direction for resetting the zoom lens to the initial focusing position. Since the cam projections 40 are located in the terminal position FW in the focusing cam grooves 41, and the axial legs 30 are in contact with the side walls 31b of the stepped recesses 31, the forward rotation of the motor 27 causes the helical movement barrel 11 to rotate to the telephoto side after the drive ring 12 rotates beyond the relative rotation range given by the movable range fR.

As a result, the brush device 56 is shifted from one of the zooming positions Z1 to Z5 to the telephoto side. As soon as any of the signal levels detected from the signal contact patterns E0 to E2 inverts from ON to OFF, the controller 46 starts driving the motor 27 at the low speed in the forward direction by the pulse number for initial focusing position, and then stops the motor 27. When the motor 27 stops, the brush device 56 is placed in one of the initial focusing positions F1 to F5.

Thereafter, the focusing control is executed on the basis of a measured subject distance in the same way as set forth above.

As described so far, the zoom lens is always reset to one of the predetermined initial focusing positions F1 to F5 prior to focusing based on the subject distance, so that the focusing control is always started in the same conditions regardless of the zooming direction and zooming position. That is, at the start of focusing, the axial legs 30 are always in contact with the side walls 31a of the stepped recesses 31, as shown in FIG. 5, whereas the cam projections 40 are always in the terminal position FT in the focusing cam grooves 41, as shown by solid lines in FIG. 7. Moreover, the rotational direction to reset the zooming lens to the initial focusing position is the same regardless of the zooming direction. Therefore, accurate focusing is achieved with simple control program.

Since the zoom lens is always reset to one of the predetermined initial focusing positions F1 to F5 prior to focusing on the subject distance, even if the helical movement barrel 11 or the cam barrel 16 are deviated by an external force in a time after the zooming before the full-depression of the shutter button, the deviation is canceled by resetting to the initial focusing position. Therefore, it is possible to make accurate focusing at any case.

Immediately after accomplishing the focusing control, the controller 46 executes the exposure control. After completion of an exposure, the controller 46 returns the zoom lens to the previous zooming position by driving the motor 27 in the reverse direction. The reverse rotation of the motor 27 causes the axial legs 30 of the drive ring 12 to move in the direction to bring the axial edges 30b into contact with the side walls 31b of the stepped recesses 31, and then causes the helical movement barrel 11 to rotate in the direction to move to the wide-angle side. As soon as an ON-signal is detected from any of the signal contact patterns E0 to E2, the controller 46 stops driving the motor 27. In this way, the helical movement barrel 11 is returned to the preceding zooming position, wherein the axial legs 30 are located in contact with the side walls 31b of the stepped recesses 31, and the cam projections 40 are located in the terminal position FW.

Accordingly, so long as the zooming position is unchanged, the resetting the zoom lens to the initial focusing position for the next exposure is started from the conditions where the axial legs 30 are in contact with the side walls 31b of the stepped recesses 31, and the brush device 56 is in contact with any of the signal contact patterns E0 to E2. Therefore, even if the helical movement barrel 11 is deviated by an external force by accident, the deviation is detected by a change in the code signals from the brush device 56 with ease.

Figure 13:
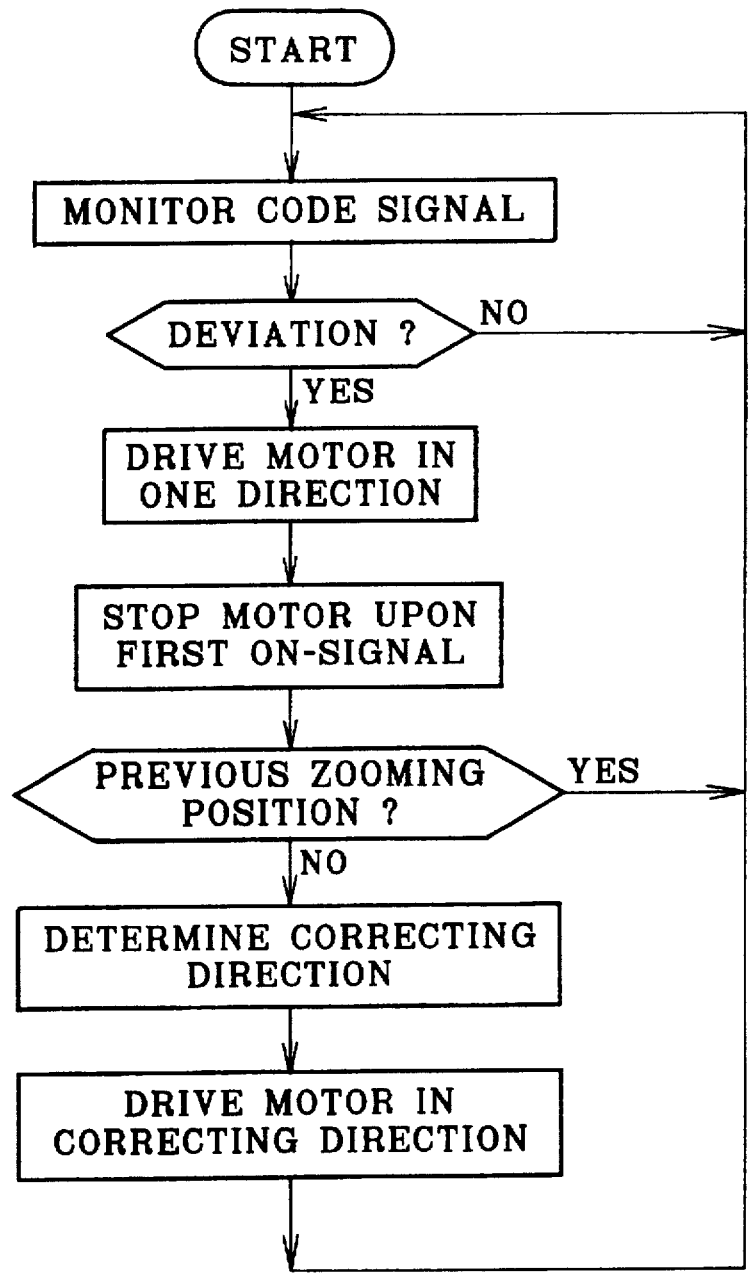
FIG. 13 is a flow chart illustrating a deviation correcting sequence of the zoom lens device of the first embodiment.

FIG. 13 illustrates the operation of detecting and correcting deviation of the zoom lens from the predetermined zooming position. To detect the deviation, the controller 46 monitors the code signals detected from the signal contact patterns E0 to E2 through the brush device 56 at random or regular intervals while either of the zooming switch and the shutter button is not operated. If a signal inversion from ON to OFF level occurs, the controller 46 determines it a deviation, and then drives the motor 27 in one direction to rotate the helical movement barrel 11. Thereafter when an ON-signal is obtained from any of the signal contact patterns E0 to E2, the controller 46 stops the motor 27, reads the data of the present zooming position from the code signals, and compare it with the data of the preceding zooming position that is previously written in the RAM 54. If these two data are identical, the controller 46 maintains the zoom lens in this position. If not, the controller 46 determines the correcting direction, and drives the motor in that correcting direction till the same zooming position as that indicated by the position data written in the RAM 54 is detected. As the helical movement barrel 11 is rotated, the cam barrel 16 is also rotated together with the helical movement barrel 11, so that the deviation of the zoom lens as the whole is corrected.

Although the resetting to the initial focusing position and the focusing are executed in response to the full-depression of the shutter button in the above embodiment, it is possible to execute these steps in response to the half-depression of the shutter button. In that case, the exposure step is executed upon the full-depression of the shutter button.

The zooming position detector is not limited to the above described embodiment which detects the rotational amount of the helical movement barrel 11. Instead, it is possible to detect the axial movement of the helical movement barrel 11. The number of available zooming positions is not limited to the above embodiment, but may be increased as much as possible, because the above mechanical configuration permits continuous zooming. The number of available zooming positions can be increased with ease just by modifying the contact patterns on the code plate 55.

It is also possible to replace the code plate 55 by a variable resistor. The variable resistor has known different resistance values for different zooming positions. To reset the zoom lens to an initial focusing position in this embodiment, the helical movement barrel 11 is rotated from a zooming position in a given direction by an amount corresponding to a given change in the resistance. Thereafter, the motor 27 is rotated in the opposite direction by an amount corresponding to a subject distance within the relative rotation range of the drive ring 12 relative to the helical movement barrel 11.

As the resistance value varies continuously with the movement of the helical movement barrel 11, the zooming position may be detected continuously rather than stepwise. Therefore, it is possible to detect any deviation of the helical movement barrel 11 from a proper zooming position can be determined immediately. Since the amount of deviation can be determined based on the increment or decrement of the resistance value, it is possible to omit the step of resetting to the initial focusing position, the step of returning to the previous zooming position, and the step of correcting the deviation as well. In that case, the focusing is executed while taking account of the deviation amount. Omitting these steps achieves quick and accurate focusing.

In the above embodiment shown in FIGS. 1 and 2, the rotational movement of the drive ring 12 is transmitted to the helical movement barrel 11 through the engagement between the axial legs 30 and the stepped recesses 31. However, it is alternatively possible to transmit the driving force of the drive ring 12 through the cam barrel 16 to the helical movement barrel 11 by the engagement of the cam projections 40 into one ends of the focusing cam grooves 41.

Although the device for changing the distance of the rear lens group 14 to the front lens group 13 is constituted of the cam pins 34 and the cam grooves 36, it is possible to move the rear lens group 14 relative to the front lens group 13 according to a lead of a helicoid mechanism.

In the above embodiment, only an area of the cam pin 34 that contacts the cam surface 36b is formed to be bendable. But it is also preferable to form the cam pins 34 to be bendable in both contact areas of the cam pin 34 with the cam groove 36. In that case, two resilient portions are formed symmetrical about the axis of the cam pin 34.

Figure 14:
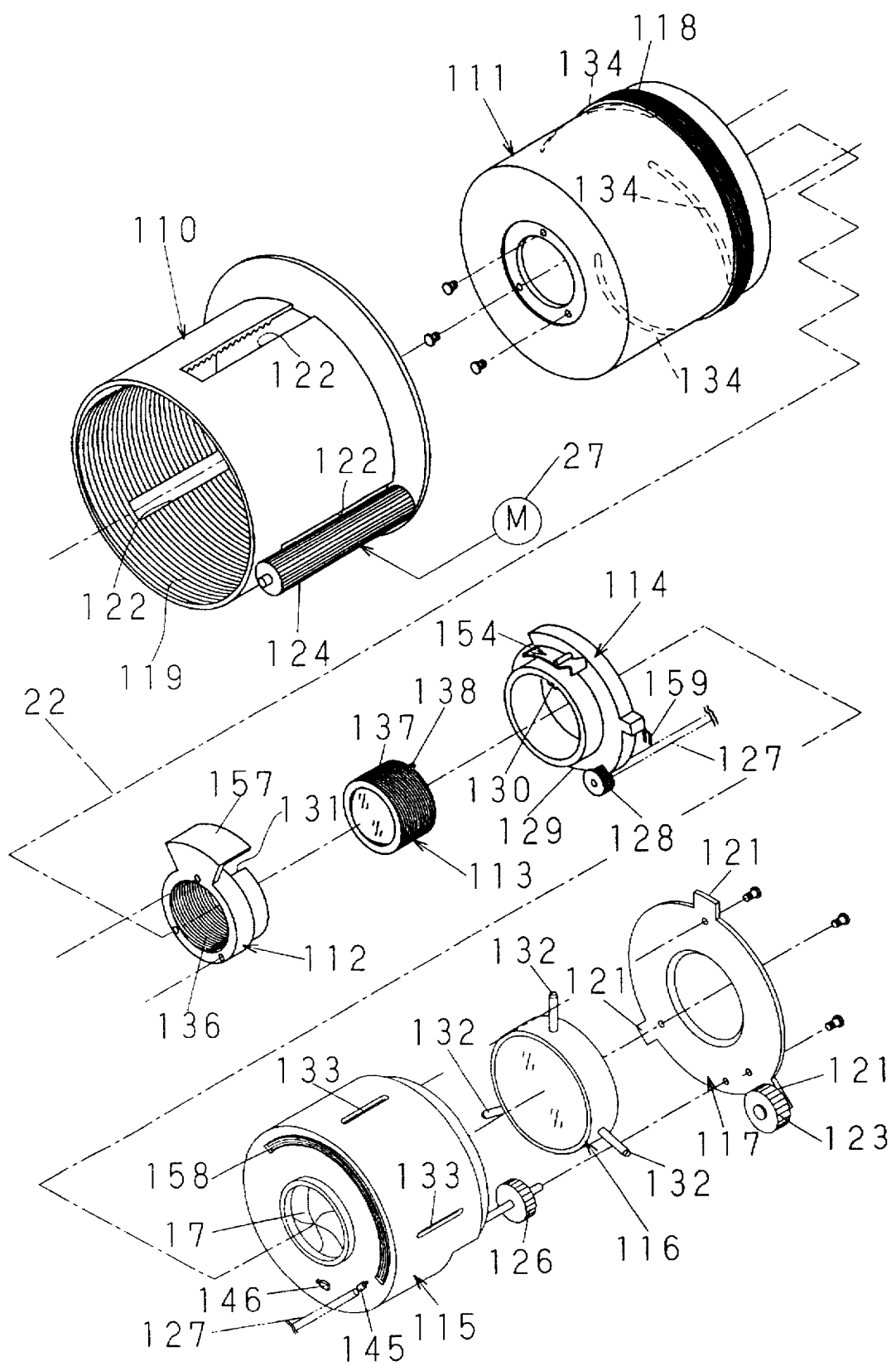
FIG. 14 is an exploded perspective view of a zoom lens device according to a second embodiment of the invention.

FIGS. 14 to 20 show a zoom lens device according to another embodiment of the present invention. The zoom lens of the second embodiment is also applied to a two component mechanical compensation type zoom lens system consisting of two lens groups. As shown in FIG. 14, the zoom lens device is mainly constituted of a fixed barrel 110, a helical movement barrel 111, a driven ring 112, a front lens group 113, a drive ring 114, an axial movement barrel 115, a rear lens group 116, and an axial movement guide ring 117. All of these elements are coaxial with an optical axis 22.

The fixed barrel 110 has an internal or female helicoid 119 around its inner periphery. The helical movement barrel 111 has an external or male helicoid 118 around its outer periphery, which is engaged with the internal helicoid 119 of the fixed barrel 110, so that the movable barrel can rotate inside the fixed barrel 110 about the optical axis 22, thereby moving in the axial direction according to the lead of the helicoid mechanism 118 and 119. The driven ring 112, the front lens group 113, the drive ring 114, the axial movement barrel 115, and the rear lens group 116 are mounted in the helical movement barrel 111 in this order from the front, wherein front is the objective side, and rear is the image side.

The axial movement guide ring 117 is secured to the rear face of the axial movement barrel 115. The axial movement guide ring 117 has three radial projections 121 formed at regular intervals around its outer circumference. The radial projections 121 are inserted in three axial slits 122 of the fixed barrel 110, to disable the axial movement barrel 115 to rotate relative to the fixed barrel 110. Thereby, the axial movement barrel 115 is movable with the helical movement barrel 111 in the direction of the optical axis 22.

A gear 123 is mounted to one of the radial projections 121 of the axial movement guide ring 117. The gear 123 is in mesh with a drive gear 124 through one of the axial slits 122 of the fixed barrel 110. The drive gear 124 transmits rotational movement of a motor 27 to the gear 123. The drive gear 124 has a certain length in its axial direction, which is parallel to the optical axis 22, so the gear 123 continues to engage with the drive gear 124 while the helical movement barrel 111 and the axial movement barrel 115 are moving along the axial direction.

The gear 123 transmits the driving power of the motor 27 to a gear 126 which is mounted in the axial movement barrel 115. The gear 126 is secured to one end of an axle 127, and a gear 128 is secured to the other end of the axle 128. The axle 127 is rotatably beard between the axial movement barrel 115 and the axial movement guide ring 117. The gear 128 is in mesh with a gear 129 which is formed through a limited angular range of the outer periphery of the drive ring 114.

The drive ring 114 is mounted on the front face of the axial movement barrel 115 to be rotatable about the optical axis 22 by the driving power of the motor 27 that is transmitted through the gears 124, 123, 127, 128 and 129. The drive ring 114 is stopped from moving in the axial direction relative to the helical movement barrel 111. The drive ring 114 has a fork ridge 130 on its inner periphery, and is coupled to the driven ring 112 through the fork ridge 130.

The fork ridge 130 is inserted in a cutout 131 of the driven ring 112. The cutout 131 extends through a certain angular range so as to has a clearance in the circumferential direction to the fork ridge 130. As the fork ridge 130 is movable within the cutout 131 in the circumferential direction, the drive ring 114 is rotatable relative to the driven ring 112 so far as the fork ridge 130 moves within the cutout 131.

Figure 15:
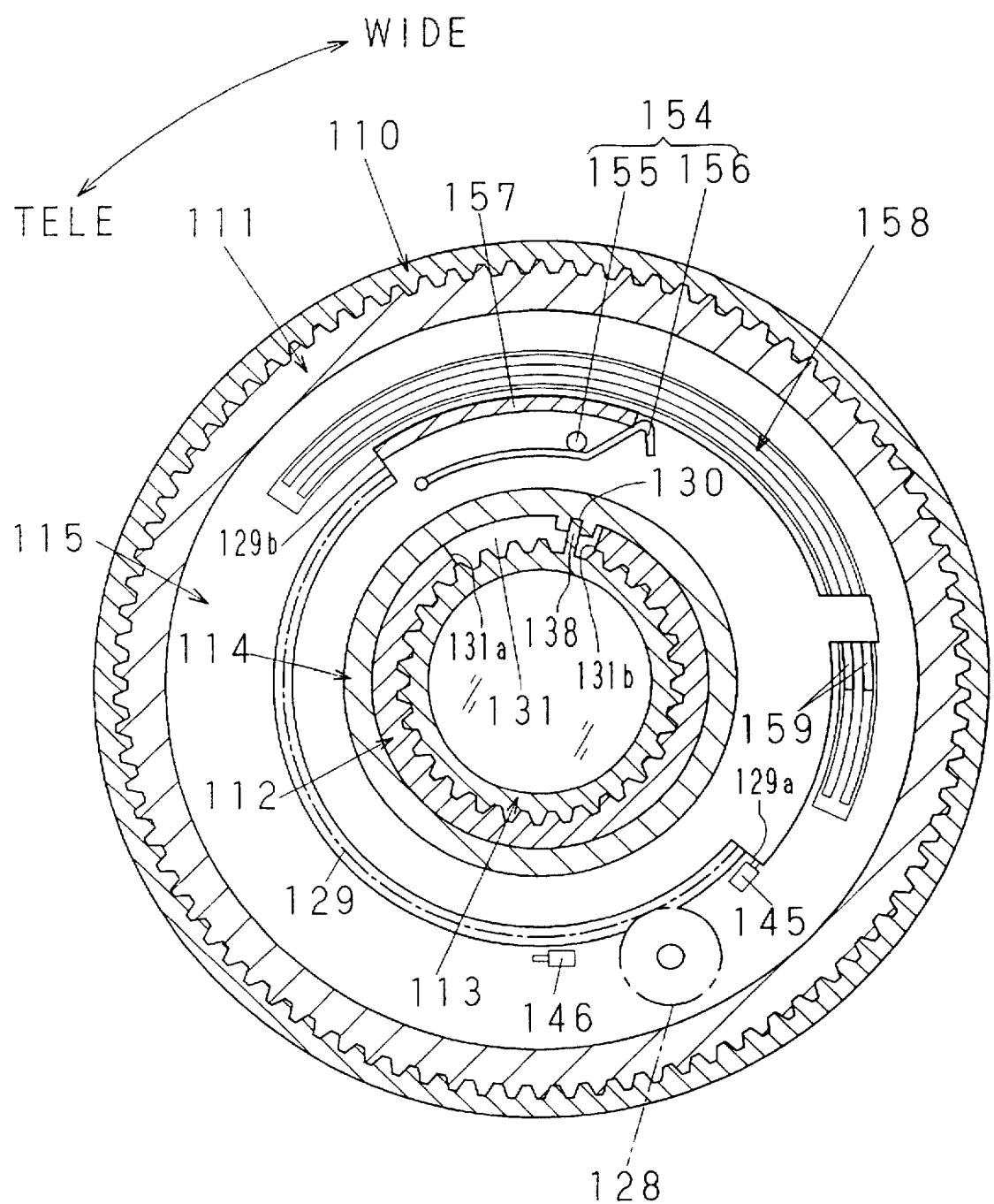
FIG. 15 is a radial sectional view of the zoom lens device of the second embodiment, illustrating an initial focusing position at a wide-angle terminal.

The driven ring 112 is secured to the front wall of the helical movement barrel 111 by screws or the like, so that the driven ring 112 and the helical movement barrel 111 rotate together and move together in the axial direction as well. The driven ring 112 has a female helicoid 136 around its inner periphery, which is engaged with a male helicoid 137 around the outer periphery of a frame of the front lens group 113. A radial projection 138 is formed on a rear portion of the outer periphery of the front lens group 113. The radial projection 138 is engaged in the fork ridge 130 of the drive ring 114 through the cutout 131 of the driven ring 112, as shown in FIG. 15. Through this engagement between the radial projection 138 and the fork ridge 130, the rotation of the drive ring 14 is transmitted to the front lens group 113.

For focusing, the drive ring 114 is rotated relative to the driven ring 12 within a relative rotation range that corresponds to the movable range of the fork ridge 130 within the cutout 131. So far as the drive ring 114 rotates relative to the driven ring 112, the front lens group 113 is rotated relative to the driven ring 112. According to the lead of the helicoid mechanism 136 and 137, the front lens group 113 moves along the optical axis 22 inside the driven ring 112. The fork ridge 130 has a certain length in the axial direction, so the radial projection 138 continues to engage in the fork ridge 130 while the front lens group 113 moves in the axial direction relative to the drive ring 114.

The rear lens group 116 is mounted in the axial movement barrel 115. The rear lens group 116 has three cam pins 132 on its outer periphery. The three cam pins 132 are spaced at regular intervals in the circumferential direction, and protrude radially outwardly through three axial guide slits 133 of the axial movement barrel 115, to be engaged in three helical cam grooves 134 of the helical movement barrel 111. Since the positions of the cam grooves 134 across the axial slits 133 are displaced in the axial direction when the helical movement barrel 111 rotates, the cam grooves 134 causes the rear lens group 116 to move in the axial direction when the helical movement barrel 111 is rotated.

The helical movement barrel 111 is rotated for zooming by a rotation of the drive ring 114 exceeding the relative rotation range to the driven ring 112. Specifically, after the drive ring 114 rotates to bring the fork ridge 130 into contact with one edge 131a or 131b of the cutout 131, further rotational movement of the drive ring 114 is transmitted through the fork ridge 130 to the driven ring 112, thereby causing the helical movement barrel 111 to rotate together with the driven ring 112. With the rotation of the helical movement barrel 111, the front lens group 113 and the rear lens group 116 move in the axial direction by the same amount as the helical movement barrel 111, and the rear lens group 116 concurrently moves relative to the front lens group 113 in the axial direction due to the axial displacement of the cam grooves 134. In this way, the focal length of the zoom lens device is changed.

Figure 16:
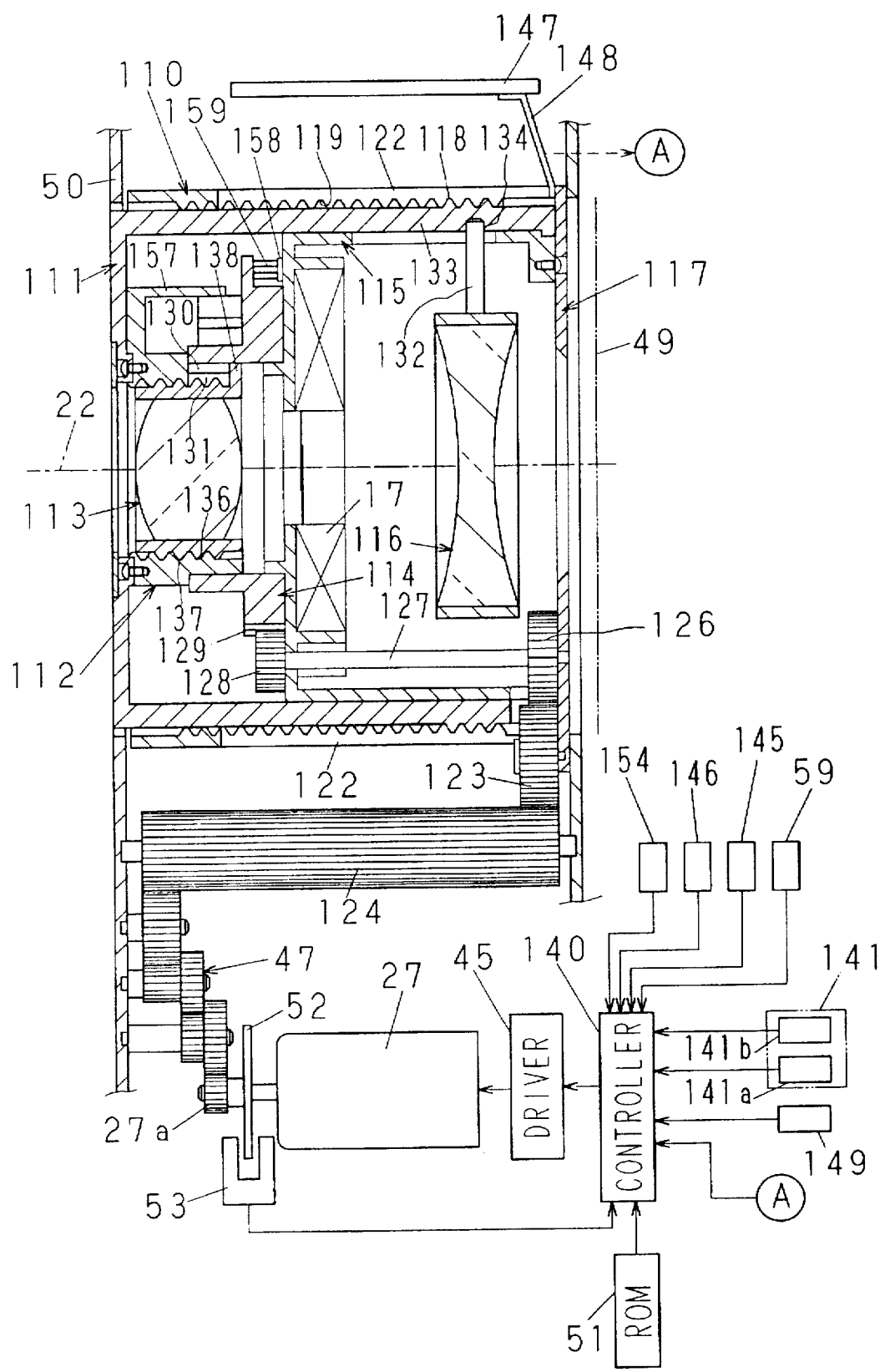
FIG. 16 is an axial sectional view of the zoom lens device of the second embodiment at the wide-angle terminal.

As shown in FIG. 16, the motor 27 is driven by a controller 140 through a driver 45. The controller 140 make a zooming in response to an operation of a zooming switch 141. The zooming switch 141 has a telephoto zooming button 141a and a wide-angle zooming button 141b. For zooming to the telephoto side, the motor 27 is rotated in a forward direction for a time while the telephoto zooming button 141a is operated. The motor 27 is rotated in a reverse direction for a time while the wide-angle zooming button 141b is operated. In FIG. 16, designated by 49 and 50 are a film surface and a front wall of the camera body respectively. A shutter block 17 is secured from inside to the front face of the axial movement barrel 115.

Figure 17:
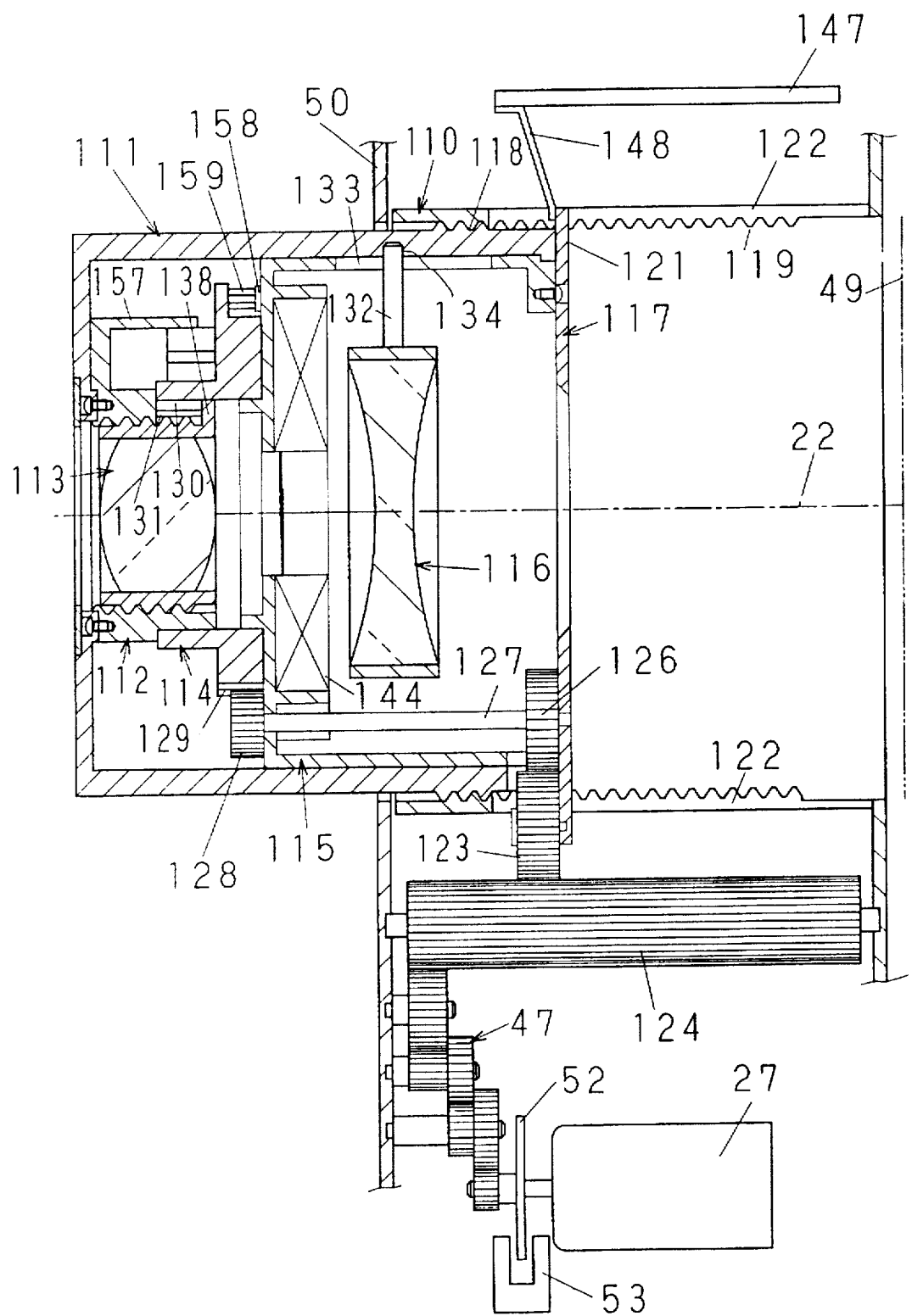
FIG. 17 is an axial sectional view of the zoom lens device of the second embodiment at a telephoto terminal.

As shown in FIGS. 16 and 17, a variable resistor 147 is secured to the fixed barrel 110, and a brush 148 is mounted to the axial movement guide ring 117 so as to be slidable on the variable resistor 147 with the axial movement of the axial movement barrel 115 and thus the helical movement barrel 111. The brush 148 is connected to the controller 140, so that the controller 140 reads a resistance value signal from the brush 148 as representative of an amount of axial movement of the helical movement barrel 111 relative to the fixed barrel 110, and determines a present zooming position based on the resistance value signal.

The controller 140 makes a focusing in response to a half-depression of a shutter button 149, wherein a range finding section 59 is activated to measure a subject distance, and drives the motor 27 by a pulse number that is determined according to the subject distance. A variety of pulse numbers predetermined for different subject distances are stored in a ROM 51. In this embodiment, the pulse number for one subject distance is constant regardless of the zooming position.

An encoder wheel 52 having radial slits is mounted on the drive shaft of the motor 27, so as to rotate together with the drive shaft. A photosensor 53 is disposed in the course of the encoder wheel 52, to detect the slits of the encoder wheel 52 and output an encoder pulse signal to the controller 140. The controller 140 counts the encoder pulses, compares the count with the pulse number read from the ROM 51 for focusing, and stops the motor 27 when the count becomes equal to the read pulse number.

As described above, the motor 27 is driven to rotate the drive ring 14 within the relative movement range for focusing. For example, when the fork ridge 130 is at a nearest position to the side edge 131b of the cutout 131, the front lens group 113 is at a rearmost position relative to the driven and drive rings 112 and 114, and the zoom lens device is focused on an infinity range. When the fork ridge 130 is at a nearest position to the other side edge 131a of the cutout 131, the front lens group 113 is at a foremost position relative to the driven and drive rings 112 and 114, and the zoom lens device is focused on a nearest range. That is, the fork ridge 130 is moved for focusing in a range that is less than the movable range of the fork ridge 130 within the cutout 131.

Figure 18:
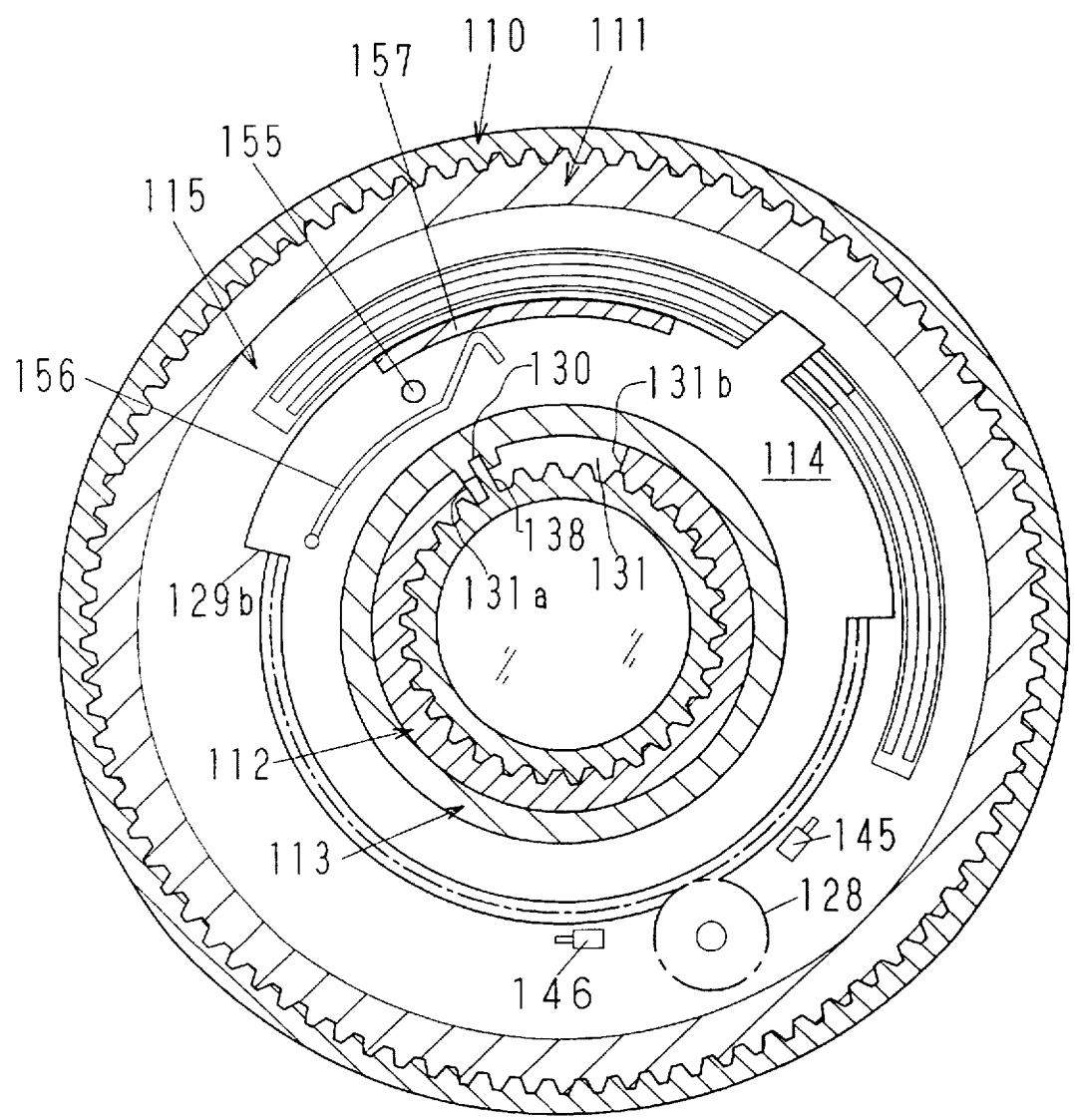
FIG. 18 is a radial sectional view of the zoom lens device of the second embodiment, illustrating a zooming position between the wide-angle terminal and the telephoto terminal.

When the zoom lens device is zoomed from a wide-angle terminal position as shown in FIG. 16 toward a telephoto terminal position as shown in FIG. 17, the drive ring 114 is rotated in a counterclockwise direction in FIG. 15, so that the fork ridge 130 moves into contact the side wall 131a, as shown in FIG. 18, and pushes the side wall 131a further in the counterclockwise direction. Thereby, the helical movement barrel 111 is rotated in the counterclockwise direction.

Figure 19:
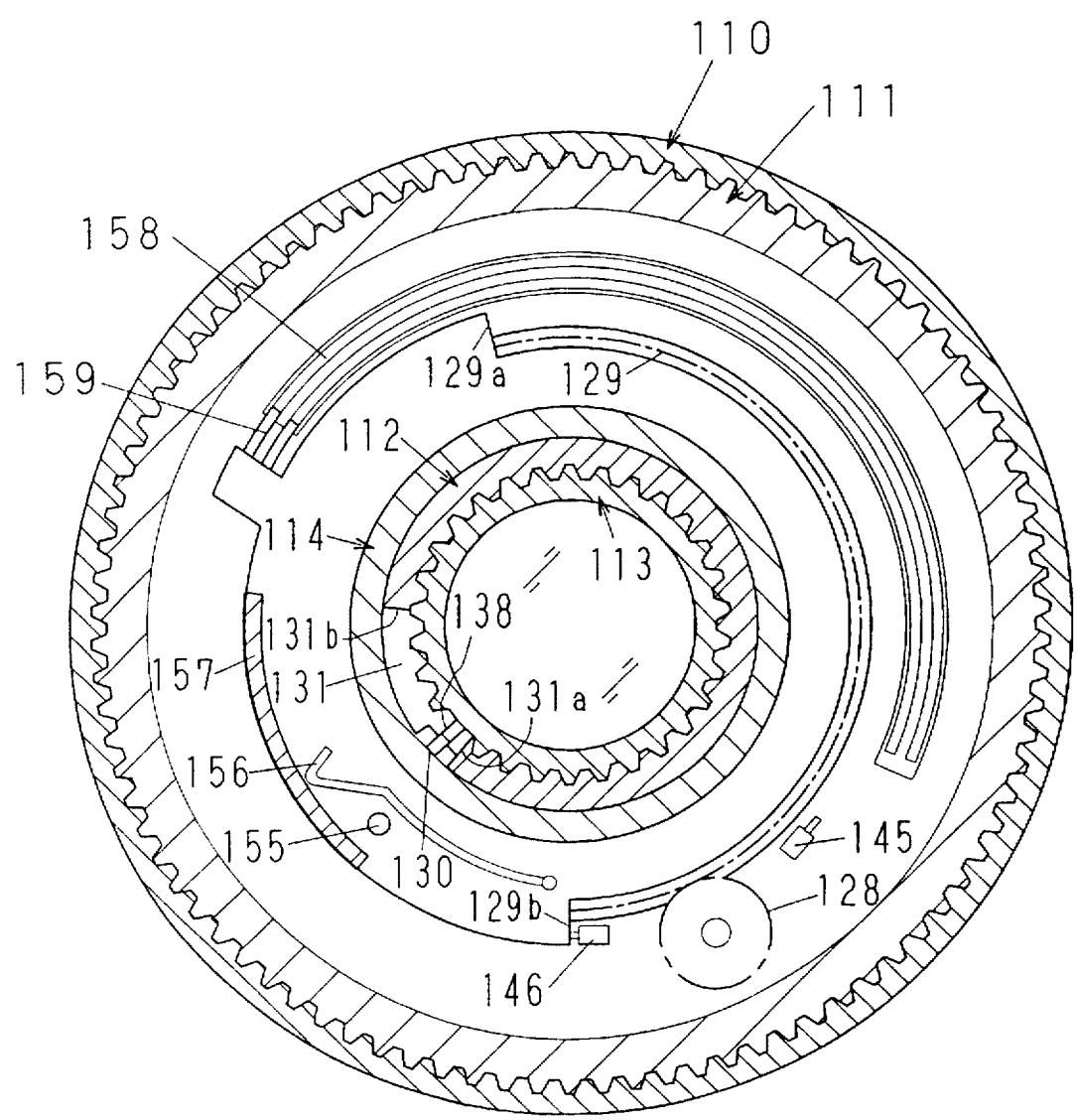
FIG. 19 is a radial sectional view of the zoom lens device of the second embodiment at the telephoto terminal.

A pair of switches 145 and 146 are disposed on the front face of the axial movement barrel 115, for detecting the wide-angle terminal position and the telephoto terminal position. Output signal from these switches 145 and 146 are monitored by the controller 140. When the zoom lens is in the wide-angle terminal position, the switch 145 is turned on by a radial wall 129a of the drive ring 114 that is formed on one end of the gear 129, as shown in FIG. 15. When the switch 145 is turned on, the controller 140 stops driving the motor 27 even while the wide-angle zooming button 141b is operated. When the zoom lens is in the telephoto terminal position, the switch 146 is turned on by a radial wall 129b of the drive ring 114 that is formed on the other end of the gear 129, as shown in FIG. 19. When the switch 146 is turned on, the controller 140 stops driving the motor 27 even while the telephoto zooming button 141a is operated.

Accordingly, when the zooming is terminated, the fork ridge 130 is in contact with either one of the side walls 131a and 131b depending upon the zooming direction. Focusing is executed after the zooming. If the focusing should start from the different positions dependent on the zooming direction, a focusing variance can be produced due to the difference in the start position. To avoid this problem, the drive ring 114 is always reset to an initial focusing position as shown in FIG. 15, where the fork ridge 130 is in between the infinity focusing position and the contact position with the side wall 131b of the cutout 131. To detect the initial focusing position, an initial focusing switch 154 is provided.

The initial focusing switch 154 is constituted of a contact pin 155 and a conductive leaf spring 156, which are disposed on the front side of the drive ring 114. A sector projection 157 with semi-cylindrical distal end is formed on the driven ring 112 such that the semi-cylindrical distal end pushes the leaf spring 156 radially inwardly unless the drive ring 114 is placed in the initial focusing position. In this initial focusing position, the semi-cylindrical distal end of the sector projection 157 is retracted from the leaf spring 156, so that the leaf spring 156 returns to contact with the contact pin 155. Thus, the initial focusing switch 154 is turned on. Output signal from the initial focusing switch 154 is sent to the controller 140 through a brush 159 formed on the drive ring 114 and an arced contact track 158 formed on the front face of the axial movement barrel 115 along the sliding course of the brush 159.

The second embodiment operates as follows. Assuming that the front and rear lens groups 113 and 116 are initially in the wide-angle terminal position as shown in FIGS. 15 and 16, wherein the switch 145 is in contact with the radial wall 129a, and the drive ring 114 is in the initial focusing position. As the switch 145 and the initial focusing switch 154 are turned on, the controller 140 recognizes that the zoom lens device is in the initial focusing position at the wide-angle terminal.

When the shutter button 149 is half depressed, the controller 140 activates the range finding section 59 to measure a subject distance, and refers to the ROM 51 to read out or calculates a pulse number necessary for focusing on the subject distance. Then, the motor 27 is driven to rotate in the forward direction. The controller 140 counts the encoder pulses obtained through the photosensor 53, and stops the motor 27 when the counts reaches the pulse number.

The rotational movement of the motor 27 is transmitted through a drive shaft gear 27a, a reduction gear train 47, the drive gear 124, and the gears 123, 126 and 128 to the drive ring 114, so that the fork ridge 130 moves in the counterclockwise direction inside the cutout 131. As the fork ridge 130 is engaged with the radial projection 138 so as the front lens group 113 to rotate together with the drive ring 114, the drive ring 114 and the front lens group 113 rotate relative to the driven ring 112. As a result, the front lens group 113 moves along the optical axis 22 according to the lead of the helicoid mechanism 136 and 137 by an amount corresponding to the pulse number determined by the subject distance.

In this way, the zoom lens device is focused on the subject distance. Simultaneously with the relative rotation of the drive ring 114 to the driven ring 112, the sector projection 157 pushes the leaf spring 156 radially inwardly to move off the contact pin 155. Thus, the initial focusing switch 154 is turned off.

When the photographer further depresses the shutter button 149 to the full, the controller 140 activates the shutter block 17. At that time, the controller 140 detects the present zooming position based on the resistance value signal from the brush 148, and determines an f-number in accordance with the present zooming position, for use in controlling exposure. After the exposure, the controller 140 drives the motor 27 in the reverse direction that causes the drive ring 114 to rotate in the clockwise direction in FIG. 15. During the reverse rotation, the controller 140 monitors the output signal from the initial focusing switch 154, and stops the motor 27 when the initial focusing switch 154 is turned on. In this way, the drive ring 114 is returned to the initial focusing position as shown in FIG. 15. Also when the photographer quits depressing the shutter button 149 without executing an exposure, the controller 140 drives the motor 27 reversely to return the drive ring 114 to the initial focusing position.

Responsive to the telephoto zooming button 141a being operated, the controller 140 drives the motor 27 to rotate in the forward direction. The forward rotation of the motor 27 causes the drive ring 14 to rotate in the counterclockwise direction, so that the fork ridge 130 moves to the side wall 131a of the cutout 131. As the drive ring 114 further rotates in the counterclockwise direction, the fork ridge 130 pushes the driven ring 112 at the side wall 131a, causing the driven ring 112 to rotate in the counterclockwise direction. The rotation of the driven ring 112 causes the helical movement barrel 111 to rotate together, so that the helical movement barrel 111 moves forward from the fixed barrel 110 according to the lead of the helicoid mechanism 118 and 119. Thus, the front and rear lens groups 113 and 116 moves forward by the same amount as the helical movement barrel 111. In addition, the rear lens group 116 moves relative to the front lens group 113 according to the axial displacement of the cam grooves 134.

When the operation of the telephoto zooming button 141a is terminated at an appropriate zooming position, the controller 140 drives the motor 27 in the reverse direction till the initial focusing switch 154 is turned on. In this way, the drive ring 114 is always reset to the initial focusing position prior to focusing. Thereafter, the focusing is executed upon a half-depression of the shutter button 149, wherein the motor 27 is driven forwardly by a pulse number determined by a subject distance. Thereby, the drive ring 114 is rotated within the relative rotation range to the driven ring 112, to move only the front lens group 113 through the helicoid mechanism 136 and 137. Upon a full-depression of the shutter button 149, an exposure is executed in the same way as above. After the exposure, the motor 27 is rotated reversely to reset the drive ring 114 to the initial focusing position.

When the telephoto zooming button 141a continues being operated till the drive ring 114 rotates to turn the switch 146 on by the radial wall 129b, the controller 140 stops driving the motor 27, as the zoom lens device reaches to the telephoto terminal position as shown in FIGS. 17 and 19. Thereafter, the drive ring 114 is reset to the initial focusing position in the same way as above.

Upon a half-depression of the shutter button 149, the focusing is execute by driving the motor 27 forwardly by a pulse number determined by a subject distance, to rotate the drive ring 114 within the relative rotation range to the driven ring 112, in the same way as above. Upon a full-depression of the shutter button 149, an exposure is executed in the same way as above. After the exposure, the motor 27 is rotated reversely till the initial focusing switch 154 is turned on, to reset the drive ring 114 to the initial focusing position.

When the wide-angle zooming button 141b is operated, the controller 140 drives the motor 27 to rotate in the reverse direction. The reverse rotation of the motor 27 causes the drive ring 14 to rotate in the clockwise direction, so that the fork ridge 130 moves to the side wall 131b of the cutout 131. As the drive ring 114 further rotates in the clockwise direction, the fork ridge 130 pushes the driven ring 112 at the side wall 131b, causing the driven ring 112 to rotate in the clockwise direction. The rotation of the driven ring 112 causes the helical movement barrel 111 to rotate together, so that the helical movement barrel 111 moves rearward into the fixed barrel 110. Thus, the focal length is changed to the wide-angle side.

Also when the operation of the wide-angle zooming button 141b is terminated at an appropriate zooming position, the drive ring 114 is reset to an initial focusing position. Since the fork ridge 130 is in contact with the side wall 131b during the zooming to the wide-angle side, the initial focusing switch 154 is already turned on at the end of zooming to the wide-angle side. Therefore, the controller 140 resets the drive ring 14 to the initial focusing position by rotating the drive ring 114 slightly in the counterclockwise direction till the initial focusing switch 154 is turned off, as shown in FIG. 20, and then in the clockwise direction till the initial focusing switch 154 is turned on again, as shown in FIG. 15.

Figure 20:
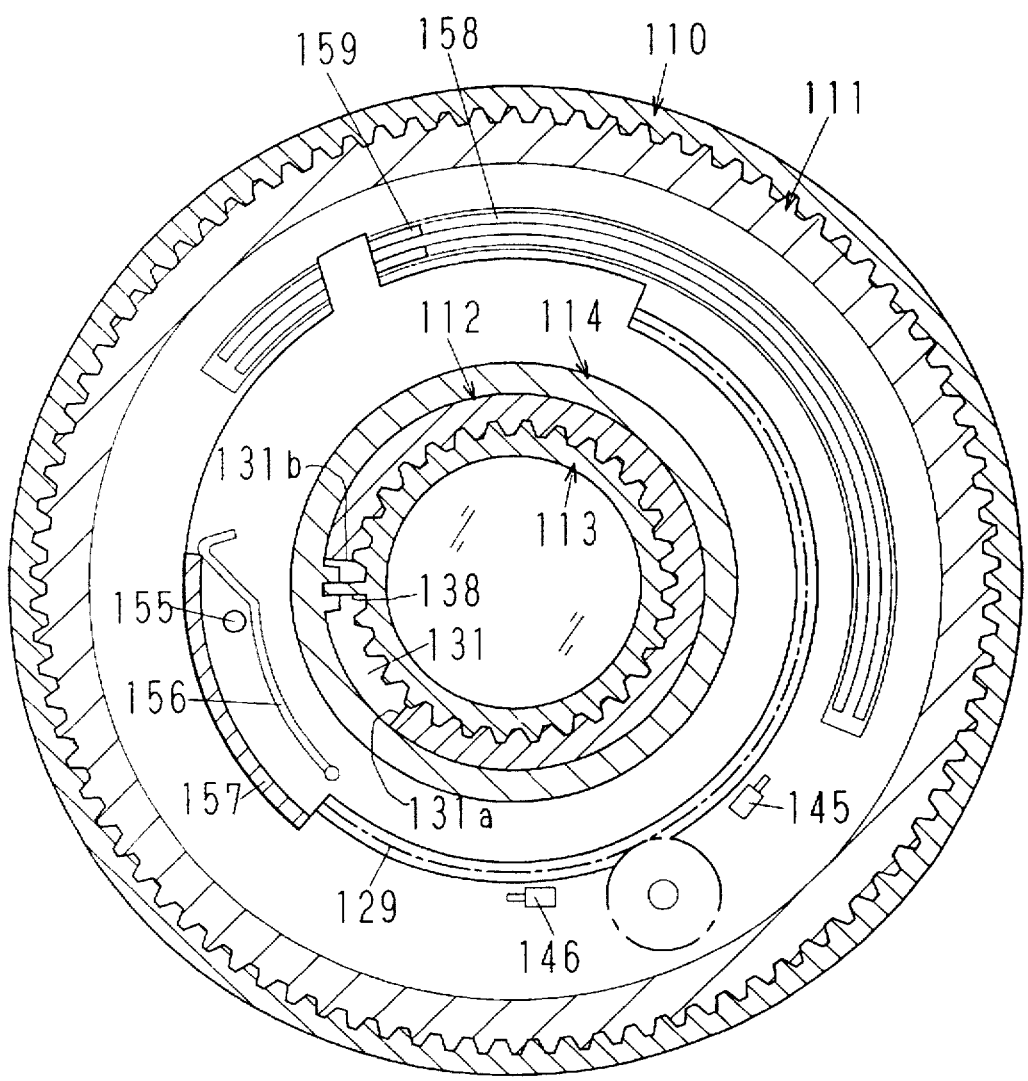
FIG. 20 is a radial sectional view of the zoom lens device of the second embodiment, illustrating a resetting step of the drive ring to the initial focusing position after zooming toward the wide-angle terminal.

Alternatively, it is possible to determine the position shown in FIG. 20 as an initial focusing position of the drive ring 114 after the zooming to the wide-angle side. In that case, the controller 140 drives the motor 27 slightly in the forward direction to rotate the drive ring 114 counterclockwise till the initial focusing switch 154 is turned off.

After resetting to the initial focusing position, the focusing is executed upon a half-depression of the shutter button 149 by rotating the drive ring 114 within the relative rotation range to the driven ring 112, in the same way as above. Upon a full-depression of the shutter button 149, an exposure is executed in the same way as above. After the exposure, the motor 27 is rotated reversely till the initial focusing switch 154 is turned on, to reset the drive ring 114 to the initial focusing position.

Although the helical movement barrel 111 and the driven ring 112 are formed separately, and are secured to each other by screws, it is possible to form the helical movement barrel 111 and the driven ring 112 as an integral body.

In the above embodiment, the drive ring 114 and the front lens group 113 are also separate, and are coupled to each other so as to be rotatable together through the engagement of the fork ridge 130 with the radial projection 138. But instead of the fork ridge 130 and the radial projection 138, any other well-known engagement between the drive ring 114 and the front lens group 113 is applicable.

It is also possible to form the drive ring 114 and the front lens group 113 as an integral body. In that case, the drive ring 114 must be movable along the optical axis 22 relative to the helical movement barrel 111, and the gear 128 or the gear 129 must has a certain length in the axial direction, so the gears 128 and 129 are maintained engaged with each other even if the drive ring 114 moves in the axial direction together with the front lens group 113.

The front lens group 113 may be moved in the axial direction through a cam mechanism instead of the helicoid mechanism 136 and 137.

Thus, the present invention should not be limited to the above described embodiments but, on the contrary, various modification may be possible to those skilled in the art without departing from the scope of claims attached hereto.

What is claimed is:

1. A zoom lens device comprising:

a fixed barrel mounted stationary to a camera body;

a helical movement barrel mounted in the fixed barrel so as to be movable along an optical axis while rotating about the optical axis, the helical movement barrel holding at least front and rear lens groups therein;

a drive ring mounted in the fixed barrel to be rotatable about the optical axis;

a motor for rotating the drive ring;

an interconnection device interconnecting the drive ring with the helical movement barrel, the interconnection device allowing the drive ring to rotate relative to the helical movement barrel within a predetermined relative rotation range, and transmitting the rotational movement of the drive ring to the helical movement barrel when the drive ring rotates beyond the relative rotation range;

a focusing mechanism for moving one of the front and rear lens groups along the optical axis in response to relative rotation of the drive ring to the helical movement barrel; and a zooming mechanism for moving the front and rear lens groups along the optical axis while changing the distance between the front and rear lens groups in response to rotation of the helical movement barrel caused by rotation of the drive ring beyond the relative rotation range.

2. A zoom lens device as claimed in claim 1, wherein the zooming mechanism comprises:

an axial movement barrel mounted in the helical movement barrel and movable along the optical axis without rotating relative to the fixed barrel with the axial movement of the helical movement barrel, the front lens group being mounted in front of the axial movement barrel, the rear lens group being mounted in the axial movement barrel;

axial slits formed through the axial movement barrel along the optical axis;

helical cam grooves provided around the axial movement barrel so as to rotate about the optical axis together with the helical movement barrel; and cam pins protruding radially outwardly from the rear lens group and being engaged in the helical cam grooves through the axial slits, such that the rear lens group is moved along the optical axis inside the helical movement barrel when the helical movement barrel is rotated.

3. A zoom lens device as claimed in claim 2, wherein the cam pin is formed to be resiliently bendable at least one of two contacting portions thereof with the cam groove.

4. A zoom lens device as claimed in claim 1, wherein the focusing mechanism comprises a cam barrel mounted in the helical movement barrel so as to be movable along the optical axis relative to the helical movement barrel, the one of the front and rear lens groups being engaged with the cam barrel so as to move together along the optical axis, wherein the cam barrel has cam grooves engaged with cam projections formed on the drive ring such that the cam barrel moves along the optical axis in response to the rotation of the drive ring within the relative rotation range.

5. A zoom lens device as claimed in claim 1, wherein the focusing mechanism comprises a driven ring integrated in the helical movement barrel so as to rotate about the optical axis and move along the optical axis together with the helical movement barrel, the driven ring holding the one of the front and rear lens groups therein such that the one lens group is movable along the optical axis while being rotated inside the driven ring by the rotation of the drive ring within the relative rotation range.

6. A zoom lens device as claimed in claim 5, wherein the one lens group rotates together with the drive ring and has a male helicoid around an outer periphery thereof, and the driven ring has a female helicoid around an inner periphery thereof to be engaged with the male helicoid of the one lens group.

7. A zoom lens device as claimed in claim 6, wherein the drive ring is coupled to the driven ring through the interconnection device such that the driven ring and the helical movement barrel are rotated together by the rotation of the drive ring beyond the relative rotation range.

8. A zoom lens device as claimed in claim 1, further comprising:

a manual operated zooming operation member;

a zooming position detector for detecting rotational amount or axial movement amount of the helical movement barrel;

a zooming control device for driving the motor in response to the operation of the zooming operation member;

a rotational amount detector for detecting rotational amount of the motor;

a subject distance detector; and a focusing control device for driving the motor to rotate the drive ring by an amount determined according to a subject distance detected by the subject distance detector, within the relative rotation range.

9. A zoom lens device as claimed in claim 8, wherein the focusing control device further comprises a device for resetting the zoom lens device to an initial focusing position by driving the motor after the zooming control device sets the zoom lens device at a zooming position, the drive ring being placed at a given relative position to the helical movement barrel in the initial focusing position, that is closer to one end of the relative rotation range.

10. A zoom lens device as claimed in claim 8, wherein the zooming control device stops the motor to stop the zoom lens device at one of a plurality of predetermined zooming positions after the operation of the zooming operation member is terminated, with reference to the rotational amount or the axial movement amount of the helical movement barrel detected by the zooming position detector.

11. A zoom lens device as claimed in claim 10, wherein the focusing control device determines the amount of rotation of the drive ring within the relative rotation range depending upon the subject distance and the zooming position.

12. A zoom lens device having at least front and rear lens group, comprising:

a fixed barrel mounted stationary to a camera body;

a helical movement barrel mounted in the fixed barrel so as to be movable along an optical axis while rotating about the optical axis;

a drive ring rotated by a motor, the drive ring being coupled to the helical movement barrel with a clearance in a circumferential direction, such that the drive ring is allowed to rotate relative to the helical movement barrel within a relative rotation range defined by the clearance, and causes the helical movement barrel to rotate when rotating beyond the relative rotation range;

an axial movement barrel mounted in the helical movement barrel and movable along the optical axis without rotating relative to the fixed barrel with the axial movement of the helical movement barrel, the front lens group being mounted in front of the axial movement barrel, the rear lens group being mounted in the axial movement barrel;

axial slits formed through the axial movement barrel along the optical axis;

a cam barrel mounted around the axial movement barrel in the helical movement barrel so as to be rotatable together with the helical movement barrel and movable along the optical axis relative to the helical movement barrel;

helical cam grooves formed around an inner periphery of the cam barrel;

cam pins protruding radially outwardly from the rear lens group and being engaged in the helical cam grooves through the axial slits, such that the rear lens group is moved along the optical axis inside the helical movement barrel while the helical movement barrel is rotated;

focusing cam grooves formed around an outer periphery of the cam barrel and having different course from the helical cam grooves; and cam projections formed on the drive ring and engaged in the focusing cam grooves such that the cam barrel is moved along the optical axis in response to the relative rotation of the drive ring to the helical movement barrel.

13. A method of zooming and focusing of a zoom lens device by use of a motor, comprising the steps of:

rotating, in response to a zooming operation, a drive ring by a motor in a forward or a reverse direction by an angle beyond a given relative rotation range of the drive ring to a helical movement barrel, to rotate the helical movement barrel in the forward or the reverse direction;

moving at least front and rear lens groups with the helical movement barrel forward or backward along an optical axis in accordance with rotational amount and direction of the helical movement barrel, to set the zoom lens device in a zooming position;

detecting a subject distance;

rotating the drive ring by the motor in the forward direction to reset the zoom lens device from the zooming position to a predetermined initial focusing position; and rotating thereafter the drive ring by the motor in the reverse direction within the relative rotation range to move one of the front and rear lens groups by an amount determined based on the subject distance, thereby to set the zoom lens device to a focusing position.

14. A method of zooming and focusing of the zoom lens as claimed in claim 13, further comprising the step of rotating the drive ring in the reserve direction to return the zoom lens from the focusing position to the previous zooming position.

* * * * *